(12) United States Patent
Hayauchi et al.

(10) Patent No.: US 11,029,472 B2
(45) Date of Patent: Jun. 8, 2021

(54) OPTICAL FERRULE AND CONNECTOR

(71) Applicant: 3M INNOVATIVE PROPERTIES COMPANY, St. Paul, MN (US)

(72) Inventors: Takayuki Hayauchi, Sagamihara (JP); Terry L. Smith, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 756 days.

(21) Appl. No.: 15/115,428

(22) PCT Filed: Feb. 18, 2015

(86) PCT No.: PCT/US2015/016320
§ 371 (c)(1),
(2) Date: Jul. 29, 2016

(87) PCT Pub. No.: WO2015/126905
PCT Pub. Date: Aug. 27, 2015

(65) Prior Publication Data
US 2017/0168248 A1 Jun. 15, 2017

Related U.S. Application Data

(60) Provisional application No. 61/940,922, filed on Feb. 18, 2014.

(51) Int. Cl.
*G06K 9/62* (2006.01)
*G06K 9/00* (2006.01)
(Continued)

(52) U.S. Cl.
CPC ........... *G02B 6/3885* (2013.01); *G02B 6/383* (2013.01); *G02B 6/3821* (2013.01);
(Continued)

(58) Field of Classification Search
CPC .. G02B 6/3885; G02B 6/3829; G02B 6/3839; G02B 6/3845; G02B 6/3865; G02B 6/3882; G02B 6/38
See application file for complete search history.

(56) References Cited

U.S. PATENT DOCUMENTS 5,080,461 A * 1/1992 Pimpinella ............... G02B 6/32
385/35
5,230,032 A * 7/1993 Muzslay .................. G02B 6/25
385/139

(Continued)

FOREIGN PATENT DOCUMENTS

JP 2007-011060 1/2007
JP 2009-134262 6/2009
(Continued)

OTHER PUBLICATIONS

International Search Report for PCT International Application PCT/US2015/016320, dated Oct. 20, 2015, 6 pages.

*Primary Examiner* — Andrew Jordan
(74) *Attorney, Agent, or Firm* — Jonathan L. Tolstedt

(57) ABSTRACT

(Problem) To provide an optical ferrule that can easily accommodate multicore optical fibers, without an accompanying increase in the number of components. (Resolution Means) The optical ferrule 1 includes a guide opening 14 formed by an upper wall 10, a bottom wall 11, and a pair of side walls 12 and 13; a guide part 15 that extends forward from the upper wall 10 and the guide opening 14; and an optical coupler 20 provided on the upper surface of the upper wall 10. The optical coupler 20 has a waveguide aligning part 21 that aligns and holds an optical waveguide 2, and a light direction converter 22 that changes the direction of light from the optical waveguide 2 and emits the light toward an opposing optical ferrule 1.

16 Claims, 30 Drawing Sheets

(51) Int. Cl.
*G06K 9/32* (2006.01)
*G06K 9/20* (2006.01)
*G02B 6/38* (2006.01)
*G02B 6/42* (2006.01)

(52) U.S. Cl.
CPC ......... *G02B 6/3829* (2013.01); *G02B 6/3839* (2013.01); *G02B 6/3845* (2013.01); *G02B 6/3865* (2013.01); *G02B 6/3878* (2013.01); *G02B 6/3882* (2013.01); *G02B 6/3869* (2013.01); *G02B 6/3873* (2013.01); *G02B 6/3889* (2013.01); *G02B 6/3893* (2013.01); *G02B 6/4214* (2013.01)

(56) References Cited

U.S. PATENT DOCUMENTS

| | | | | |
|---|---|---|---|---|
| 7,108,432 | B2* | 9/2006 | Nagasaka | G02B 6/32 385/129 |
| 7,587,108 | B2* | 9/2009 | Carpenter | G02B 6/30 385/137 |
| 8,447,157 | B2* | 5/2013 | Carpenter | G02B 6/30 385/137 |
| 8,469,610 | B2* | 6/2013 | Shao | G02B 6/4292 385/93 |
| 9,482,827 | B2* | 11/2016 | Haase | G02B 6/3829 |
| 10,162,140 | B2* | 12/2018 | Smith | G02B 6/383 |
| 10,168,486 | B2* | 1/2019 | Haase | G02B 6/3829 |
| 2006/0291782 | A1* | 12/2006 | Carpenter | G02B 6/30 385/49 |
| 2006/0291793 | A1* | 12/2006 | Carpenter | G02B 6/30 385/137 |
| 2010/0215319 | A1* | 8/2010 | Childers | G02B 6/3885 385/60 |
| 2012/0063725 | A1 | 3/2012 | Meadowcroft | |
| 2012/0183256 | A1 | 7/2012 | Shao et al. | |
| 2013/0170795 | A1* | 7/2013 | Wu | G02B 6/32 385/58 |
| 2015/0205054 | A1* | 7/2015 | Smith | G02B 6/3851 385/59 |
| 2015/0219863 | A1* | 8/2015 | Haase | G02B 6/3883 385/60 |
| 2015/0234126 | A1* | 8/2015 | Haase | G02B 6/389 385/59 |
| 2016/0231521 | A1* | 8/2016 | Smith | G02B 6/383 |
| 2016/0320568 | A1* | 11/2016 | Haase | G02B 6/3882 |
| 2017/0017044 | A1* | 1/2017 | Haase | G02B 6/3829 |
| 2017/0017047 | A1* | 1/2017 | Haase | G02B 6/3829 |
| 2017/0059785 | A1* | 3/2017 | Smith | G02B 6/3821 |
| 2017/0168248 | A1* | 6/2017 | Hayauchi | G02B 6/3885 |

FOREIGN PATENT DOCUMENTS

| | | |
|---|---|---|
| WO | 2013-048743 | 4/2013 |
| WO | 2014-055361 | 4/2014 |

* cited by examiner

OPTICAL FERRULE AND CONNECTOR

FIELD OF THE INVENTION

The present invention relates to an optical ferrule and a connector for connecting optical fibers together.

BACKGROUND

MT connectors are known as connectors for connecting optical fibers together. For example, Japanese Unexamined Patent Application Publication No. 2009-134262 (patent document 1) discloses an MT connector where optical fiber holes are formed in a row in an MT ferrule integrally molded with a resin, and multicore optical fibers are inserted and fixed into the optical fiber holes. The MT ferrule not only has optic fiber holes, but also has a mating pin for positioning, and a mating hole where the mating pin mates.

REFERENCE DOCUMENTS

Patent Documents

Patent Document 1: Japanese Unexamined Patent Application Publication No. 2009-134262

SUMMARY OF THE INVENTION

Problems to be Solved by the Invention

However, the MT ferrule disclosed in patent document 1 has a mating pin, so the cost is increased in conjunction with an increase in the number of components. Furthermore, the MT ferrule disclosed in patent document 1 requires space for the mating pin and the mating hole, and therefore the space for attaching the optical fiber is correspondingly reduced, and thus using multicore optical fibers is difficult.

Therefore, an object of the present invention is to provide an optical ferrule and connector that can easily accommodate multicore optical fibers.

Means for Solving the Problem

One aspect of the present invention is an optical ferrule, including: an upper wall; a bottom wall on the opposite side as the upper wall; a pair of side walls that face each other and connect the upper wall and the bottom wall, such that a guide opening is formed on an inside thereof together with the upper wall and the bottom wall; a guide part that extends forward from the upper wall and the guide opening; and an optical coupler provided on an upper surface of the upper wall; the optical coupler having a waveguide aligning part that aligns and holds an optical waveguide, and a light direction converter; the light direction converter having: an entrance surface that receives incoming light from the optical waveguide that is aligned and arranged by the waveguide aligning part; a light direction converting surface that receives light from the entrance surface propagated along an incoming axis, and reflects the received light, wherein the reflected light is propagated by the light direction converting surface along a direction converted axis that is different from the incoming axis; and an exit surface that receives light from the light direction converting surface and propagates the received light along an outgoing axis, and transmits the light as outgoing light emitted from the optical ferrule; the optical ferrule having an integrated structure.

Furthermore, another aspect of the present invention provides a connector with a housing, the housing including: a first attaching region that holds and retains the optical waveguide, and moves inside the housing; and an optical coupler disposed inside the housing and that moves inside the housing; the optical coupler including: a second attaching region that holds and retains an optical waveguide that is held and retained in the first attaching region; and a light direction converting surface that receives light from the optical waveguide and converts the direction, when an optical waveguide is held and retained in the first attaching region and the second attaching region; wherein when the connector is mated to an opposing connector, the first attaching region moves and causes the optical coupler to move.

Effect of the Invention

With the present invention, an optical ferrule includes a guide part and a guide opening configured with an integrated structure, and therefore can easily accommodate multicore optical fibers without an associated increase in the number of components.

DETAILED DESCRIPTION

Figure 1:
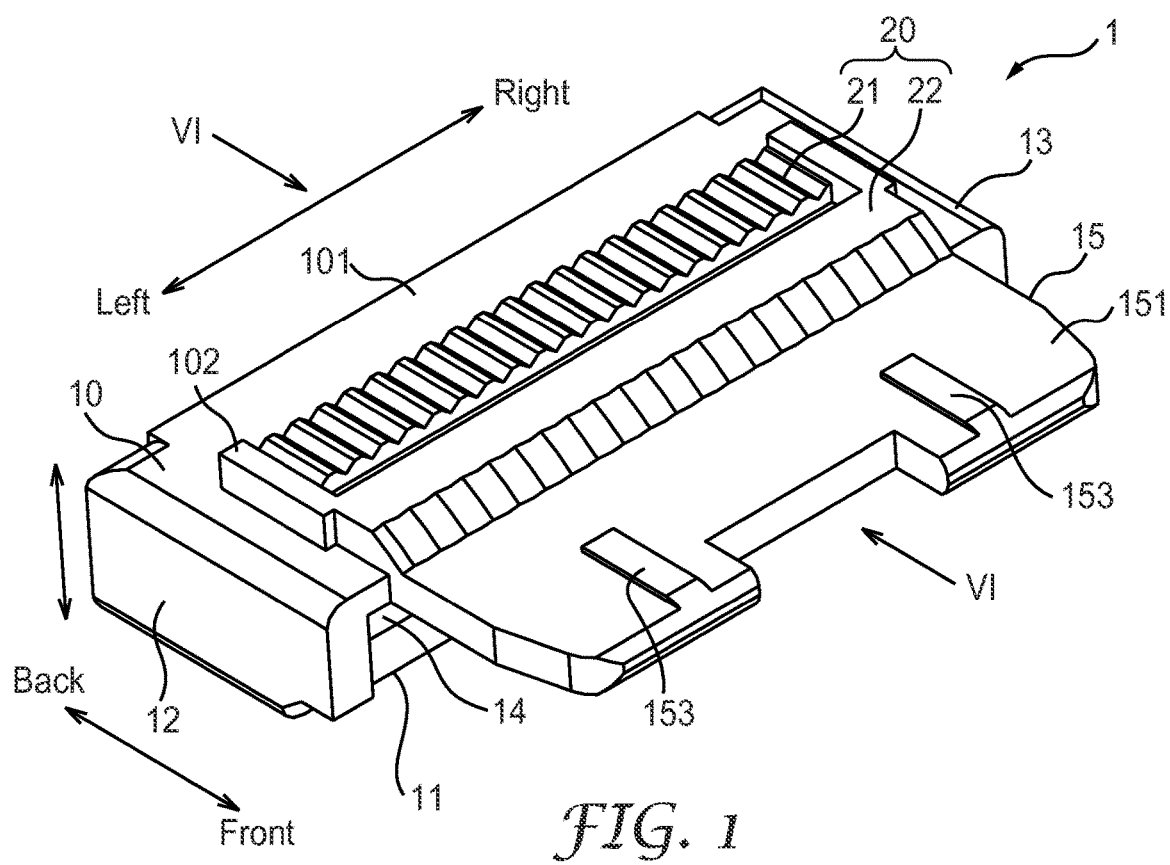
FIG. 1 is a perspective view illustrating a configuration of an optical ferrule according to an embodiment the present invention.
Figure 2:
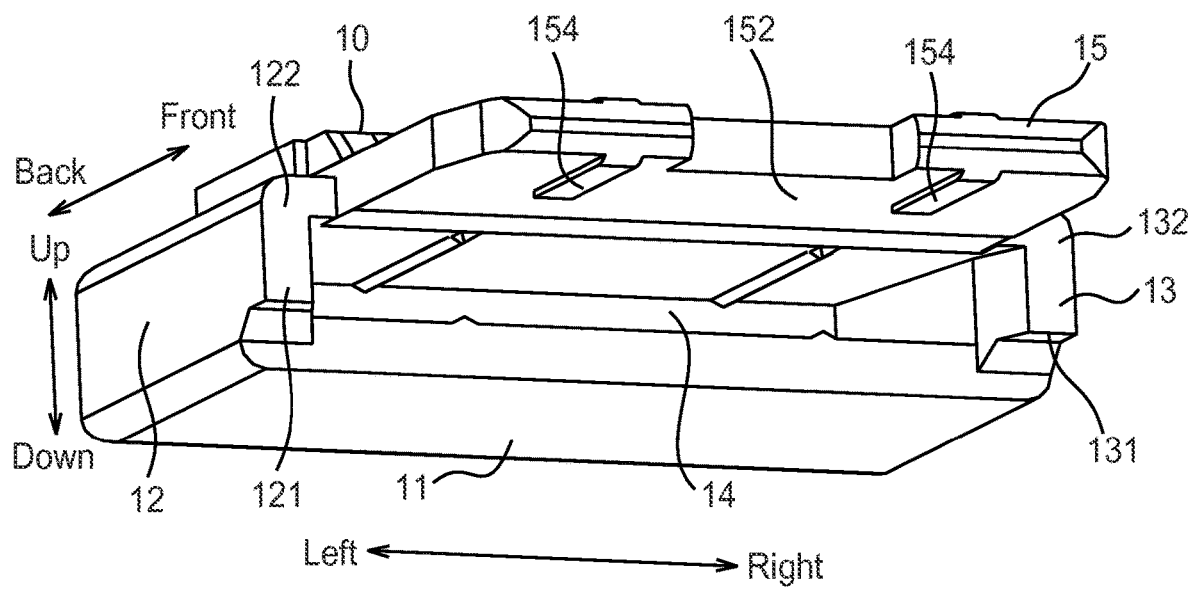
FIG. 2 is a perspective view illustrating a configuration of an optical ferrule according to an embodiment the present invention.
Figure 3:
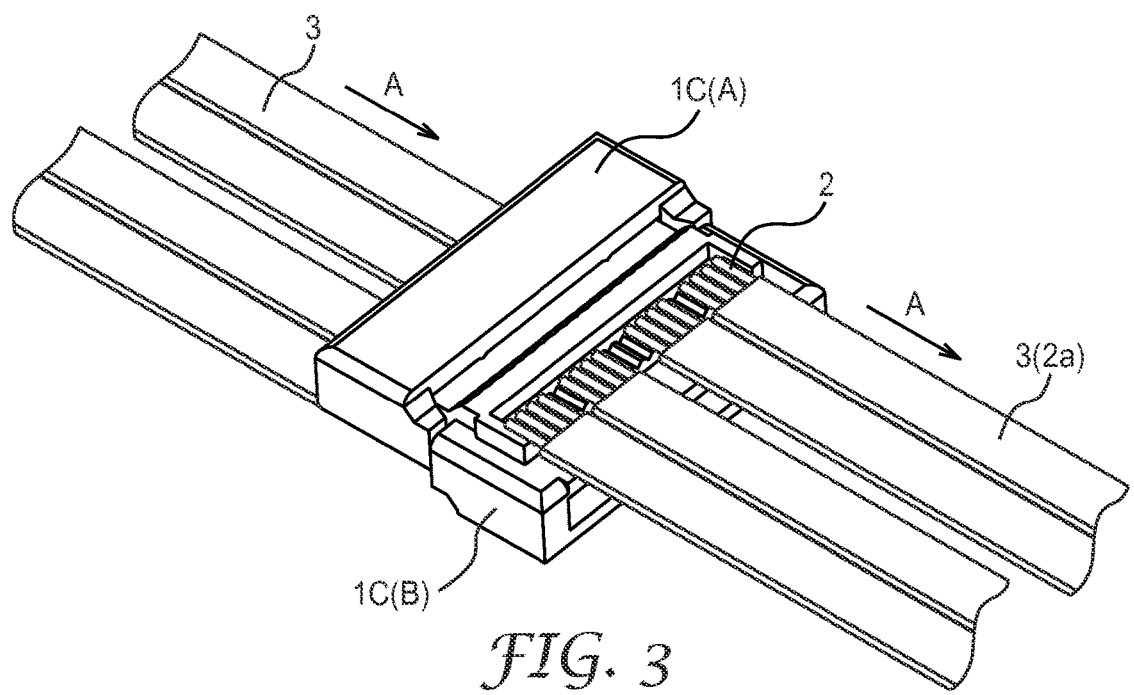
FIG. 3 is a perspective view illustrating an example of applying of an optical ferrule according to an embodiment the present invention.

An optical ferrule according to an embodiment of the present invention is described below while referring to FIG. 1 through FIG. 9. FIGS. 1 and 2 are perspective views illustrating a configuration of an optical ferrule 1 according to an embodiment of the present invention, and FIG. 3 is a perspective view illustrating an example of using the optical ferrule 1. Note that FIG. 3 illustrates a mated state of a pair of optical ferrules 1 (1A and 1B). The pair of optical ferrules 1A and 1B have the same shape, and the optical ferrule 1 is a male-female unit in the present embodiment.

As illustrated in FIG. 3, the end parts of a plurality of optical fibers 2 each exposed from a fiber ribbon 3 are fixed to the pair of optical ferrules 1A and 1B, and the tip parts of the plurality of optical fibers 2 are aligned and connected to each other by the pair of optical ferrules 1A and 1B. Thereby, light is transmitted in the direction of arrow A of FIG. 3 through the first ferrule 1A on the incoming light side and the second ferrule 1B on the outgoing light side. Note that below, the front-back direction (length direction), the left-right direction (width direction), and the vertical direction (thickness direction) are defined as illustrated in FIGS. 1 and 2, and the configuration of each part is described in accordance with these definitions as a matter of convenience. The front-back direction is the direction in which the optical fiber 2 extends, and the left-right direction is the direction in which the plurality of optical fibers 2 are arranged in parallel.

The optical fiber 2 has a core and cladding, and assumes a cylindrical shape with a predetermined outer diameter (for example, 125 μm). An ultraviolet curing resin (UV resin) or the like is coated on the circumference of the optical fiber 2, and thus a fiber wire 2a with a predetermined outer diameter (for example, 250 μm) is configured. The fiber ribbon 3 is formed by aligning the plurality of optical fiber wires 2a and then coating the entire circumference thereof with UV resin or the like, and in FIG. 3, the fiber ribbon 3 has four optical fiber wires 2a arranged in four rows in the width direction. Note that the assembly of the optical ferrule 1 and the fiber ribbon 3 including the optical fiber 2 and optical fiber wires 2a is referred to as an optical fiber unit 100.

As illustrated in FIGS. 1 and 2, the optical ferrule 1 has an upper wall 10, a bottom wall 11 on the opposite side of the upper wall 10, and a pair of side walls 12 and 13 on the left and right, facing each other and connecting the upper wall 10 and the bottom wall 11, and the entire body assumes a symmetrical shape. A rectangular guide opening 14 passing through in the front-back direction is formed on the inside of the upper wall 10, bottom wall 11, and side walls 12 and 13. A guide part 15 that extends forward from the front end part of the guide opening 14 is provided on the upper wall 10, and an optical coupler 20 is provided on the upper surface of the upper wall 10.

Figure 4:
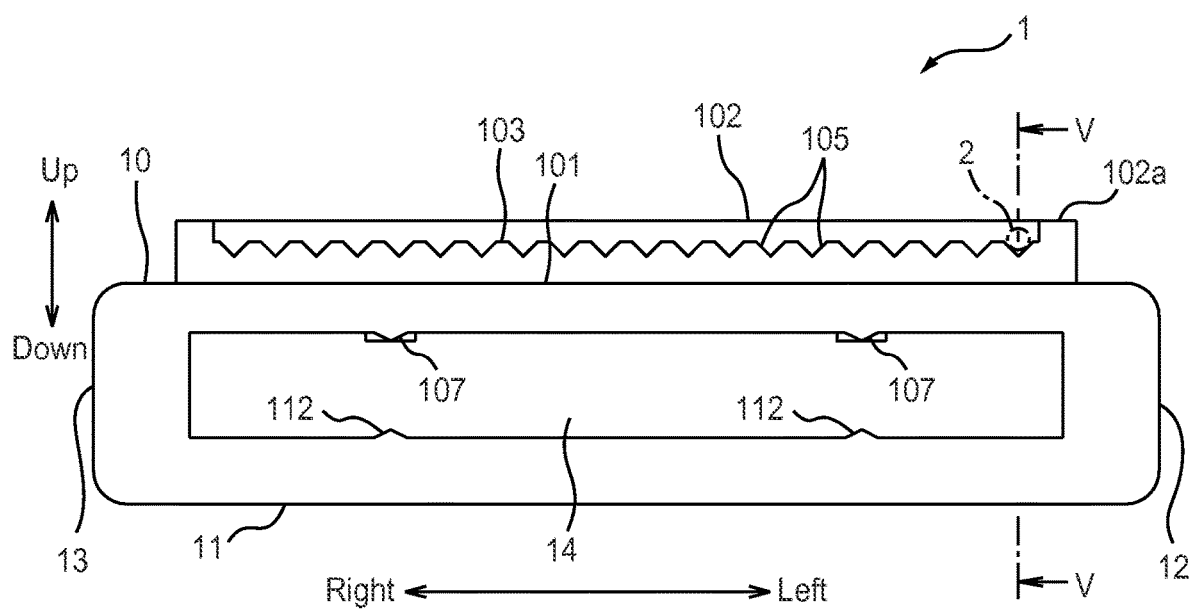
FIG. 4 is a view in the direction of arrow IV in FIG. 1.
Figure 5:
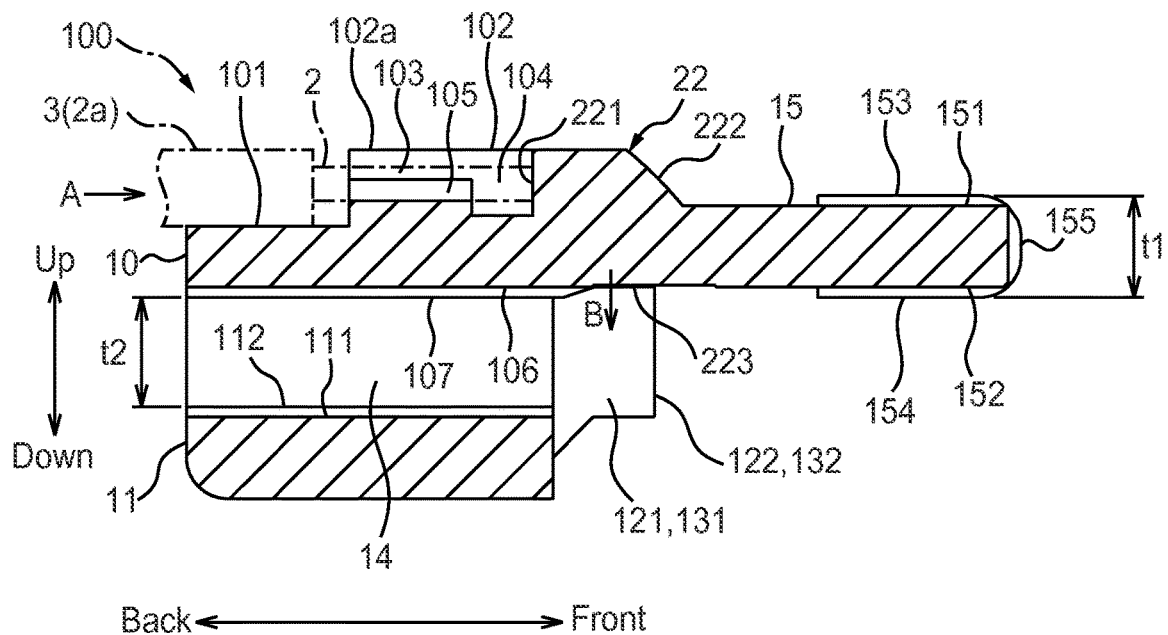
FIG. 5 is a cross-section view cut along line V-V in FIG. 4.

The optical coupler 20 has an alignment part 21 that aligns and hold the optical fibers 2, and a light direction converter 22. FIG. 4 is a view in the direction of arrow VI in FIG. 1, and FIG. 5 is a cross-sectional view cut along line V-V in FIG. 4. As illustrated in FIGS. 4 and 5, an expanded part 102 that is wide in the left-right direction from the center portion in the front-back direction to the front end part is provided on an upper surface 101 of the upper wall 10. A first groove part 103 of a predetermined depth is provided on the rear end part of the expanded part 102, and a second groove part 104 that is deeper than the first groove part 103 is provided in front of the first groove part 103. The light direction converter 22 is provided in front of the second groove part 104.

V grooves 105 in the same quantity as the optical fibers 2 are formed in the left-right direction at equal intervals on the bottom surface of the first groove part 103. The depth of the V grooves 105 is shallower than the depth of the second groove part 104. The V grooves 105 function as the alignment part 21, and the optical fibers 2 are positioned by the V grooves 105. On the tip part of the fiber ribbon 3, the coating of the fiber ribbon 3 and the coating of the fiber wires 2a are removed, and the optical fibers 2 are exposed. The exposed optical fibers 2 are placed in the V grooves 105 in a state where the front end part thereof is in contact with the rear end surface 221 of the light direction converter 22. In this state, adhesive is filled around the circumference of the optical fibers 2, and the optical fibers 2 are fixed on the expanded part 102 by the adhesive. In the state where the optical fibers 2 are placed and fixed, the optical fibers 2 are positioned lower than the upper surface 102a of both left and right end parts of the expanded part 102. Therefore, the maximum height of the optical fiber unit 100 that attaches the optical fibers 2 to the optical ferrule 1 is regulated by the expanded part 102.

A rear end surface 221 of the light direction converter 22 is a vertical surface that extends in the vertical and left-right directions, and forms an entrance surface that receives incoming light from the optical fiber 2 arranged by aligning with the V grooves 105, in other words, the incoming light in the direction of arrow A in FIG. 5. A slanted surface 222 that is slanted at a predetermined angle (for example, 45 degrees) toward the front is provided on the front end part of the light direction converter 22, and the slanted surface 222 receives light from the entrance surface 221 and forms a light direction converting surface that totally reflects the received light downward. A bottom surface 223 of the light direction converter 22 below the light direction converting surface 222 is a flat surface that extends in the front-back and left-right directions. The bottom surface 223 receives light from the light direction converting surface 222 and forms an exit surface that emits the received light from the optical ferrule 1 downward (direction of arrow B).

Note that in FIG. 5, the optical ferrule 1 was described as a first optical ferrule 1A (refer to FIG. 1) on the incoming light side. In contrast, with the second optical ferrule 1B on the outgoing light side, the direction of movement is opposite from the first optical ferrule 1A, the bottom surface 223 of the optical ferrule 1 becomes an entrance surface, and the vertical surface 221 forms the exit surface. The entrance surface and the exit surface are perpendicular to the incidence direction and emission direction of the light.

Figure 6:
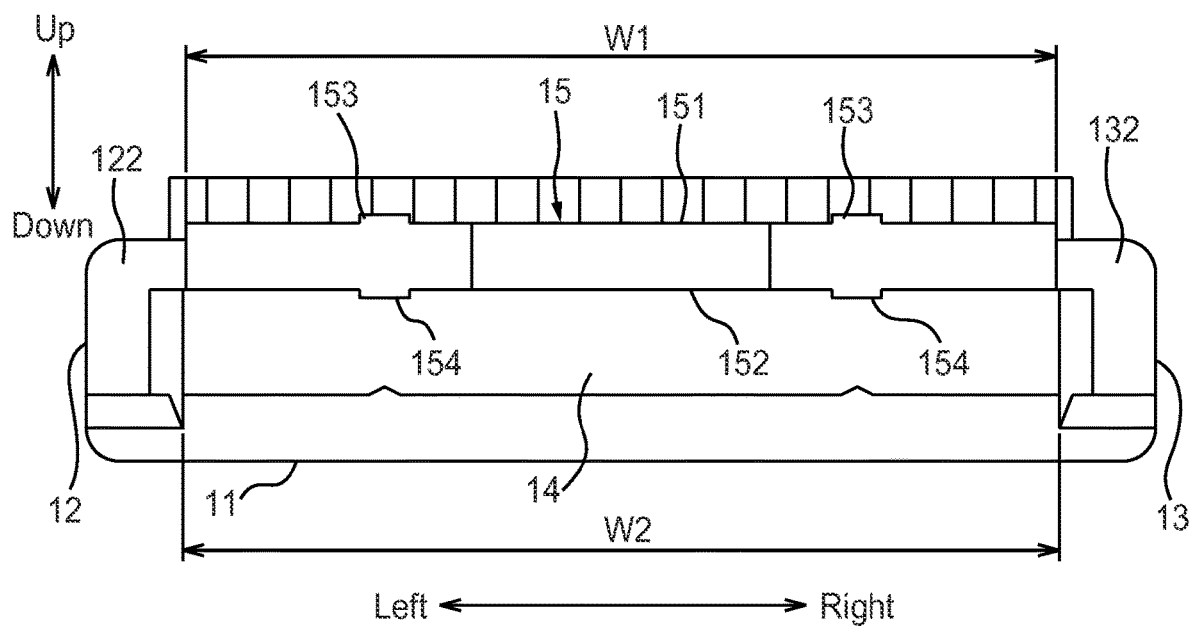
FIG. 6 is a view in the direction of arrow VI in FIG. 1.

FIG. 6 is a view in the direction of arrow VI in FIG. 1. As illustrated in FIGS. 1, 2, and 6, a left and right pair of first protruding parts 153 and 154 protruding upward and downward extend in the front-back direction on the upper surface 151 and the bottom part 152 of the guide part 15. The first protruding part 153 and first protruding part 154 are positioned in the same respective positions in the left-right direction. As illustrated in FIG. 6, the first protruding parts 153 and 154 assume a cross-sectional rectangular shape, and the upper surface of the first protruding part 153 and the bottom surface of the first protruding part 154 are both flat surfaces.

As illustrated in FIG. 5 the first protruding parts 153 and 154 are both formed with a predetermined length rearward from the front end part of the guide part 15. The front end parts of the first protruding parts 153 and 154 are formed with a tapered shape, and a front end part 155 of the guide part 15 that is more forward than the first protruding parts 153 and 154 is also formed with a tapered shape. Therefore, the length from the upper end surface of the first protruding part 153 to the lower end surface of the first protruding part 154, in other words, a maximum thickness t1 of the guide part 15 is reduced toward the front end surface of the guide part 15.

As illustrated in FIGS. 4 and 5, a left and right pair of second protruding parts 107 and 112 both protruding toward the guide opening 14 extend rearward on a bottom surface 106 of the upper wall 10 and an upper surface 111 of the bottom wall 11 rearward of the guide part 15. The second protruding part 107 and the second protruding part 112 are positioned in the same respective positions in the left-right direction, and the positions in the left-right direction match with the first protruding parts 153 and 154. As illustrated in FIG. 4, the second protruding parts 107 and 112 assume a cross-sectional triangular shape, and the cross-sectional area is reduced toward the guide opening 14.

As illustrated in FIG. 5 the second protruding part 112 on the lower side is formed from the front end surface to the rear end surface of the bottom wall 11. On the other hand, the second protruding part 107 on the upper side is formed at a position more forward than the front end surface of the bottom wall 11 and more rearward than the exit surface 223 of the light direction converter 22 to the rear end surface of the upper wall 10, and the front end surface of the second protruding part 107 is formed with a tapered shape. The length from the bottom surface of the second protruding part 107 to the upper surface of the second protruding part 112, in other words, a minimum thickness t2 of the guide opening 14 is approximately equal to the maximum thickness t1 of the guide part 15.

As illustrated in FIG. 6, a length w1 in the left-right direction of the guide part 15 is approximately equal to a length w2 in the left-right direction of the guide part 14. As illustrated in FIG. 1, both left and right end surfaces of the front end part of the guide 15 are formed with a tapered shape, and the width of the guide 15 narrows toward the front. As illustrated in FIGS. 2 and 5, the front end parts of the side walls 12 and 13 protrude more forward than the bottom wall 11, and the left and right inner wall surfaces of the protruding parts 121 and 131 are formed with a tapered shape. Therefore, the length of the interval between the left and right inner wall surfaces of the protruding parts 121 and 131 that connect to the guide opening 14 increases toward the front. The front end surfaces of the side walls 12 and 13 configure vertical surfaces 122 and 132 that extend in the vertical and left-right directions.

The aforementioned optical ferrule 1 uses resin having light transmissivity as a component and is integrally configured by resin molding. In other words, the optical ferrule 1 is configured by a single part. Therefore, the number of parts and cost can be reduced.

Figure 7A:
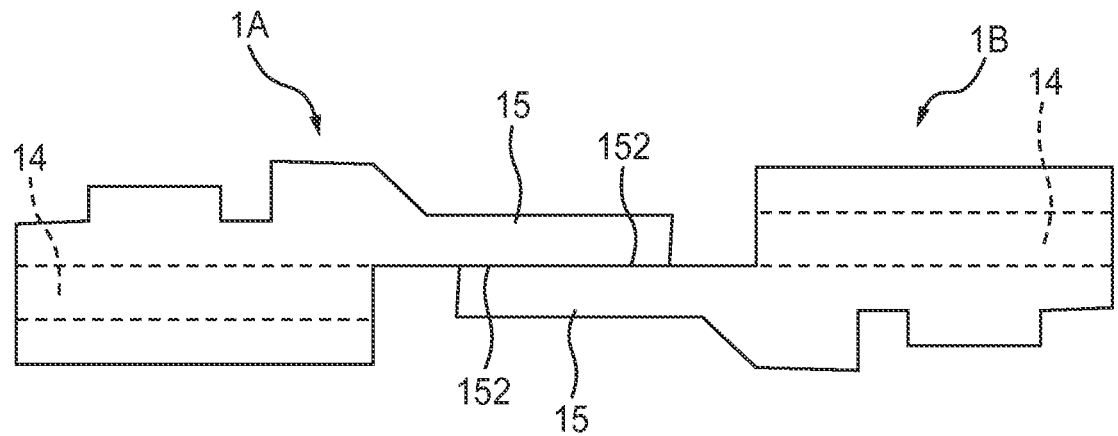
FIG. 7A is a diagram for describing the method of mating the optical ferrule according to an embodiment of the present invention.
Figure 7B:
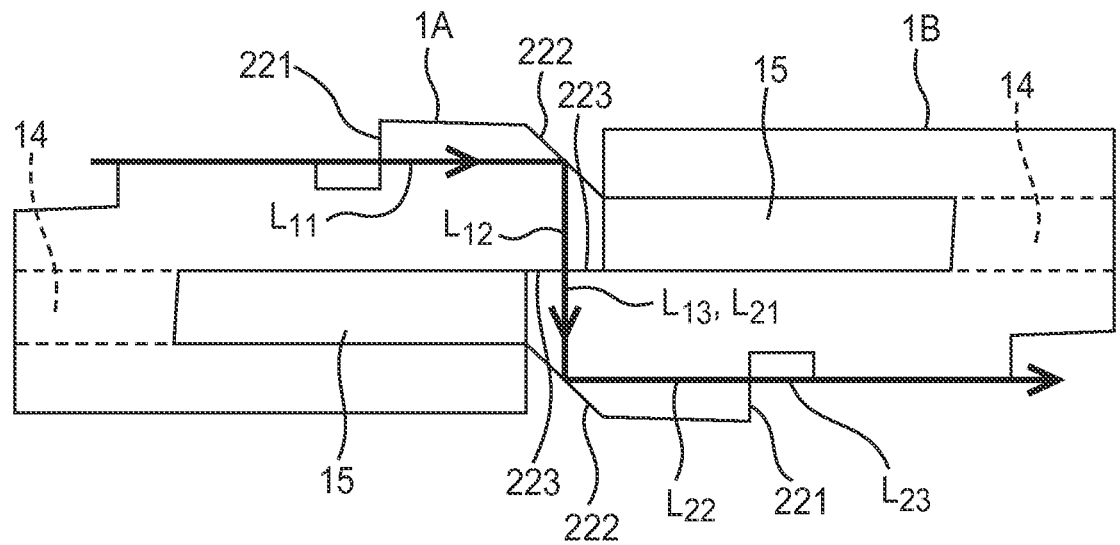
FIG. 7B is a diagram for describing the method of mating the optical ferrule according to an embodiment of the present invention.

The mating method of the pair of optical ferrules 1A and 1B will be described. FIG. 7A and FIG. 7B are a diagrams for describing the mating method of the optical ferrules 1A and 1B. Note that the optical ferrules 1A and 1B are mated in a state where the plurality of optical fibers 2 are fixed to each of the optical ferrules 1A and 1B in advance, but in FIGS. 7A and 7B, an illustration of the optical fibers 2 is omitted.

First, as illustrated in FIG. 7A, the second optical ferrule 1B is inverted in the vertical direction relative to the first optical ferrule 1A, and the bottom surface 152 of the guide part 15 of the first optical ferrule 1A and the bottom surface 152 of the guide part 15 of the second optical ferrule 1B come into mutual contact. Next, while the guide part 15 of the second optical ferrule 1B slides in the length direction along the guide part 15 of the first optical ferrule 1A, the guide part 15 of the second optical ferrule 1B is inserted into the guide opening 14 of the first optical ferrule 1A, and the guide part 15 of the first optical ferrule 1A is inserted into the guide opening 14 of the second optical ferrule 1B, respectively.

At this time, the tip part of the guide part 15 and the entrance part of the guide opening 14 are formed with a tapered shape in the height direction and the thickness direction respectively, and therefore, insertion of the guide part 15 into the guide opening 14 is simple. After the guide part 15 is inserted, the first protruding parts 153 and 154 (FIG. 6) of the guide part 15 and the second protruding parts 107 and 112 (FIG. 4) of the guide opening 14 come into mutual contact, and the first protruding parts 153 and 154 slide on top of the second protruding parts 107 and 112. Therefore, the frictional force when inserting the guide part 15 is reduced, and the inserting force when mating the first optical ferrule 1A and the second optical ferrule 1B can be reduced. When the guide part 15 is completely inserted into the guide opening 14, the first optical ferrule 1A and the second optical ferrule 1B are in a mated state as illustrated in FIG. 7B. In the mated state, the end part of the guide part 15 is positioned on the inner side of the guide opening 14 without protruding to the outside from the guide opening 14.

Figure 8:
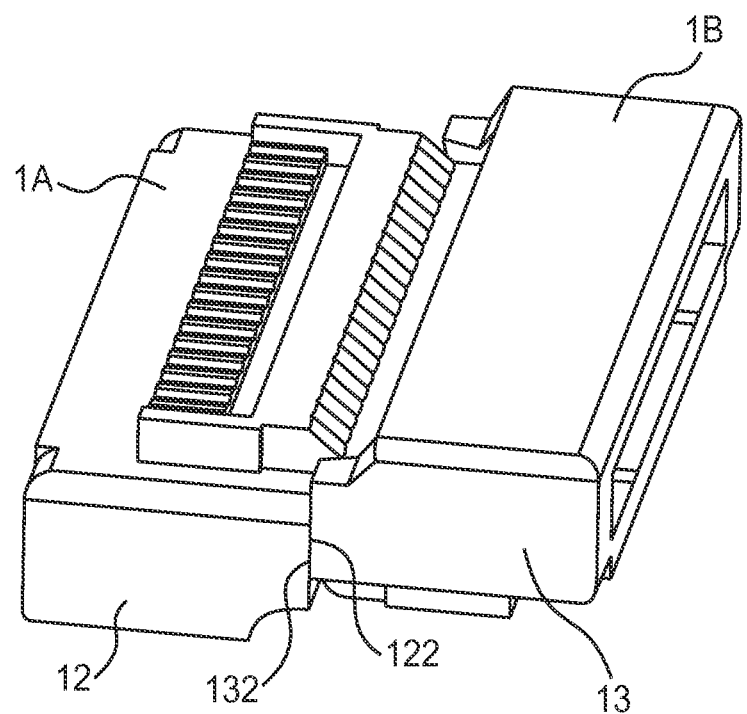
FIG. 8 is a perspective view illustrating a mated condition of the optical ferrule of an embodiment the present invention.

FIG. 8 is a perspective view illustrating the mated state of the optical ferrules 1A and 1B. As illustrated in FIG. 8, in the mated state, the vertical surfaces 122 and 132 of the side walls 12 and 13 of the first optical ferrule 1A, and the vertical surfaces 122 and 132 of the side walls 12 and 13 of the second optical ferrule 1B come into mutual contact, and the relative position in the length direction of the second optical ferrule 1B with regards to the first optical ferrule 1A is regulated. Furthermore, the maximum thickness t1 (FIG. 5) of the first protruding parts 153 and 154 of the guide part 15, and the minimum height t2 of the second protruding parts 107 and 112 of the guide opening 14 are approximately equal, and the relative position in the height direction of the second optical ferrule 1B with regards to the first optical ferrule 1A is regulated. Furthermore, the width w1 (FIG. 6) of the guide part and the width w2 of the guide opening 14 are approximately equal, and the relative position in the width direction of the second optical ferrule 1B with regards to the first optical ferrule 1A is regulated.

By regulating the relative position in the length direction, the height direction, and the width direction of the second optical ferrule 1B with regards to the first optical ferrule 1A in this manner, as shown in FIG. 7B, the bottom surface 223 (exit surface) of the first optical ferrule 1A and the bottom surface 223 (entrance surface) of the second optical ferrule 1B can be arranged facing each other with high positional accuracy.

FIG. 7B also illustrates the transmission path of the light. The incoming light entering the first optical ferrule 1A from the optical fibers 2 through the entrance surface 221 is propagated along an incoming axis L11, and is totally reflected by the light direction converting surface 222, thereby changing the direction. The light with a change in direction is propagated along an outgoing axis L12 for which the direction was converted, emitted along an outgoing axis L13 from the exit surface 223, and is transmitted to the second optical ferrule 1B as outgoing light.

The light transmitted to the second optical ferrule 1B through the entrance surface 223 is propagated along an incoming axis L21, and is totally reflected by the light direction converting surface 222, thereby changing the direction. The light with a change in direction is propagated along a direction converted axis L22, emitted along an outgoing axis L23 from the exit surface 221, and is transmitted to the optical fibers 2 as outgoing light. At this time, the outgoing axis L13 where the first optical ferrule 1A emits light and the incoming axis L21 where the second optical ferrule 1B receives light are the same axis, and therefore, transmission loss of the light at the connection surface of the optical ferrules 1A and 1B can be reduced.

The optical ferrule of the present embodiment can provide the following effects.

(1) The optical ferrule 1 provides: an upper wall 10; a bottom wall 11; a pair of facing side walls 12 and 13 that are connected to the upper wall 10 and the bottom wall 11 such that a guide opening 14 is formed on the inner side together with the upper wall 10 and the bottom wall 11; a guide part 15 that extends forward from the upper wall 10 and the guide opening 14; and an optical coupler 20 that is located on the upper surface of the upper wall 10. The optical coupler 20 has an alignment part 21 that aligns and hold the optical fibers 2, and a light direction converter 22. The light direction converter 22 has an entrance surface 221 or 223 that receives incoming light from the optical fibers 2 that are aligned and positioned by the alignment part 21; a light direction converting surface 222 that receives the light propagated along the incoming axis L11 or L21 from the entrance surface 221 or 223, and then reflects the received light; and an exit surface 223 or 221 that receives the light from the light direction converting surface 222, propagates the received light along the outgoing axis L13 or L23, and then transmits the light as outgoing light emitted from the optical ferrule 1A or 1B. The optical ferrules 1A and 1B have an integrated structure.

Therefore, the optical ferrule 1 does not require a mating pin or mating hole that is required by MT ferrules, and also does not require installation space therefor. Therefore, multicore optical fibers can be easily realized without increasing the number of parts.

(2) The pair of optical ferrules 1A and 1B that are mated together are male-female units. Therefore, the parts can be commonized, and the cost can be reduced.

(3) The optical ferrule 1 provides: first protruding parts 153 and 154 that protrude from the upper surface 151 and the bottom surface 152 of the guide part 15, and extend along the length direction of the optical ferrule 1; and second protruding parts 107 and 112 that protrude from the bottom surface 106 of the upper wall 10 and the upper surface 111 of the bottom wall 11, and extend along the length direction of the optical ferrule 1 toward the guide opening 14. Therefore, of the upper and lower surfaces of the guide part 15 and the upper and lower surfaces of the guide opening 14, only the first protruding parts 153 and 154 and the second protruding parts 107 and 112 are required to be processed with high accuracy, and thus the processing cost can be reduced.

(4) One of the optical ferrules 1A was made to mate along a mating direction parallel to the length direction of the other optical ferrule 1B, and therefore, the optical fibers 2 that extend in the length direction of the optical ferrules 1A and 1B can be connected in an approximately linear state.

(5) The guide parts 15 of the first optical ferrule 1A and the second optical ferrule 1B are both inserted on the inner side of the guide openings 14 of the opposing first optical ferrule 1A and second optical ferrule 1B respectively, and therefore, the first optical ferrule 1A and the second optical ferrule 1B can be easily mated.

(6) When the first optical ferrule 1A and the second optical ferrule 1B are mated, the first protruding parts 153 and 154 of the first optical ferrule 1A and the second optical ferrule 1B are connected to the second protruding parts 107 and 112 of the opposing first optical ferrule 1A and the second optical ferrule 1B so as to slide, and therefore, the contact area of the guide part 15 and the guide opening 14 is reduced, and insertion of the guide part 15 into the guide opening 14 is easy. The first protruding parts 153 and 154 are formed with a cross-sectional rectangular shape, and the second protruding parts 107 and 112 are formed with a cross-sectional triangular shape, and therefore, the guide part 15 and the guide opening 14 are in linear contact at two left and right points, and while the contact area is reduced, the guide part 15 can be stabilized and supported within the guide opening 14.

Note that with the embodiment, the waveguide alignment part (alignment part 21) that aligns and contains the optical fibers 2 as an optical waveguide is configured by the V grooves 105, but the configuration of the waveguide alignment part is not restricted thereto. With the embodiment, the direction in which the light reflected by the light direction converting surface 22 propagates through the optical ferrule 1 (direction of the direction converted axis), and the direction that the outgoing light is emitted from the optical ferrule 1 (direction of the outgoing axis) are the same, but as long as the reflected light is propagated in a different direction than the direction that the light that enters the optical ferrule 1 is propagated (direction of the incoming axis), the direction of the direction converted axis can be different from the direction of the outgoing axis.

Figure 9:
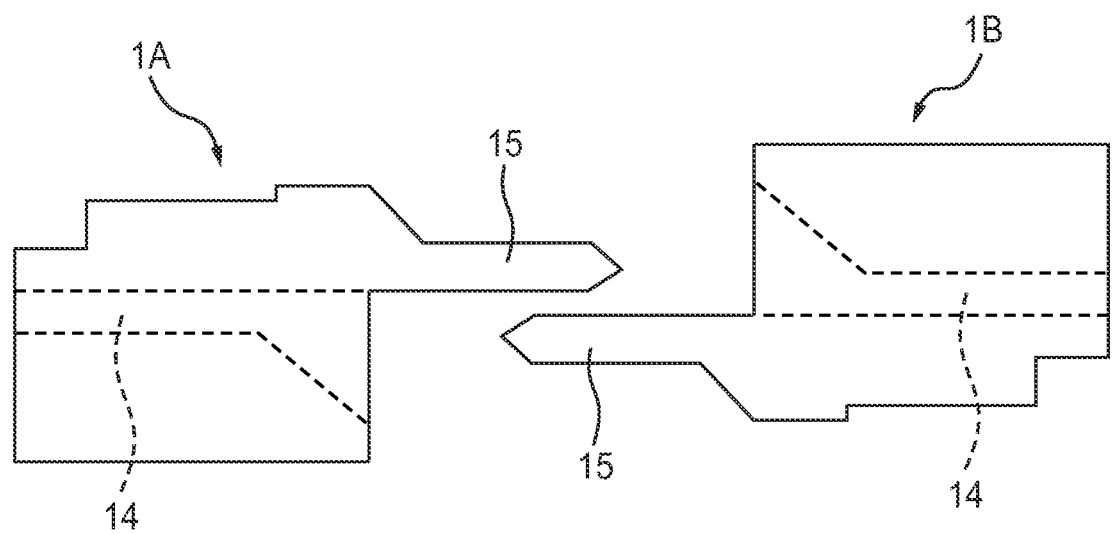
FIG. 9 is a diagram illustrating an alternate example of an optical ferrule according to an embodiment of the present invention.

With the embodiment, the surface of the inner wall in the left-right direction of the protruding parts 121 and 131 on the entrance side of the guide opening 14 is formed with a tapered shape (FIG. 2), but as illustrated in FIG. 9, the surface of the inner wall in the vertical directions of the entrance side of the guide opening 14 can be formed with a tapered shape. Thereby, mating of the first optical ferrule 1A and the second optical ferrule 1B becomes even easier.

Figure 10:
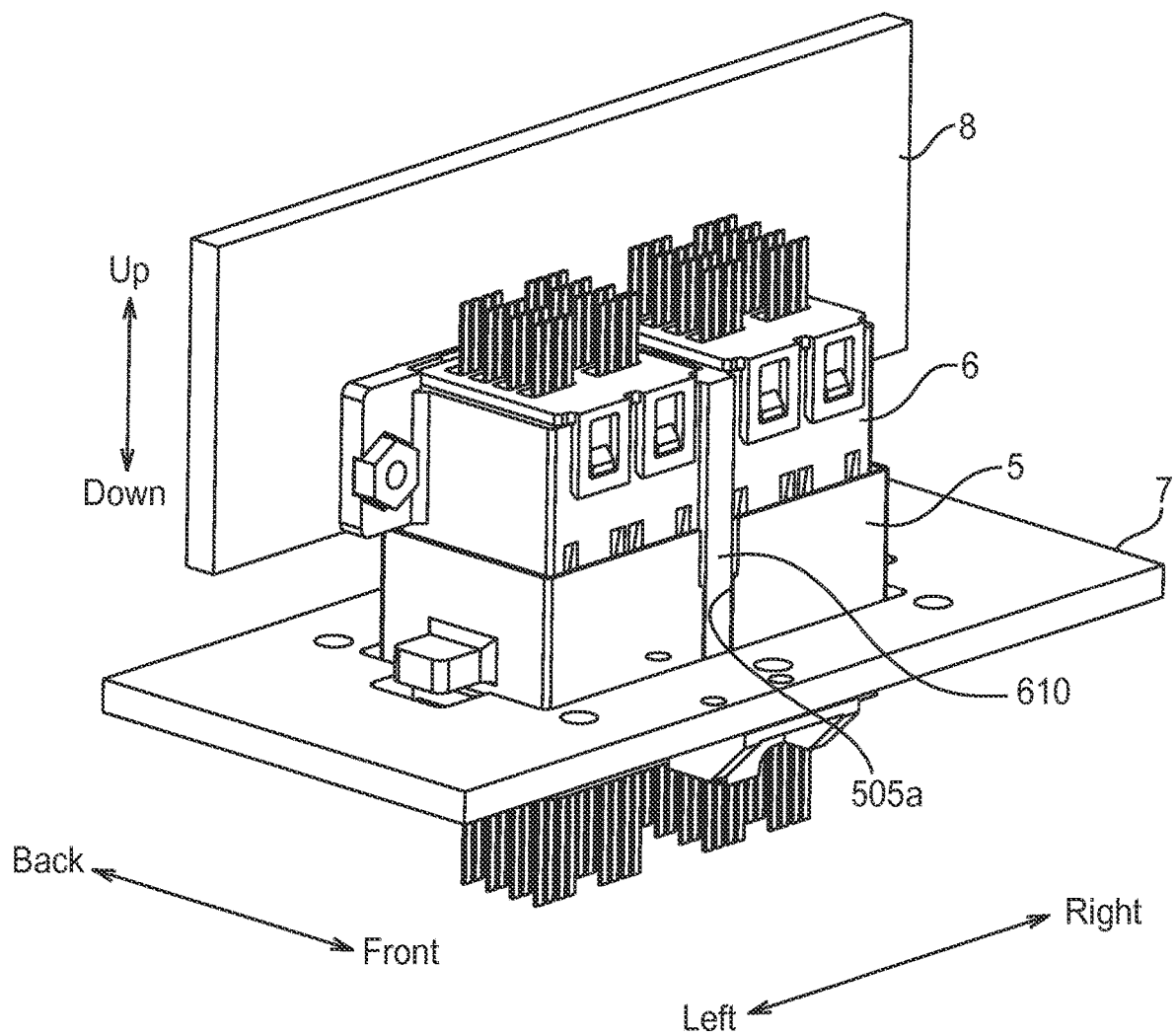
FIG. 10 is a perspective view illustrating a mated condition of the optical connector of an embodiment the present invention.

Next, the optical connector according to an embodiment of the present invention is described while referring to FIG. 10 through FIG. 29. FIG. 10 is a perspective view illustrating the mated state of the optical connectors (first optical connector 5 and second optical connector 6) according to an embodiment of the present invention. Note that below, the front-back direction, the left-right direction, and vertical direction are defined as illustrated by the drawings, and the configuration of each part is described in accordance with these definitions as a matter of convenience. The vertical direction is the mating direction of optical connectors 5 and 6.

The first optical connector 5 is attached to a first substrate 7 that extends in the front-back and left-right directions, and the second optical connector 6 is attached to a second substrate 8 that extends in the vertical and left-right directions. A tip part of a plurality of optical fiber units 100 (FIG. 3) that extend in the vertical direction, in other words, a tip part of the optical fiber units 100 having the aforementioned first optical ferrule 1A is disposed on the first optical connector 5. A tip part of the plurality of optical fiber units 100 that extend in the vertical direction, in other words, a tip part of the optical fiber units 100 having the aforementioned second optical ferrule 1B is disposed on the second optical connector 6. When the first optical connector 5 and the second optical connector 6 are mated, the first optical ferrule 1A and the second optical ferrule 1B are mated, and the tip parts of the optical fiber units 100 on the first optical connector side and the optical fiber units 100 on the second optical connector side are connected.

Figure 11A:
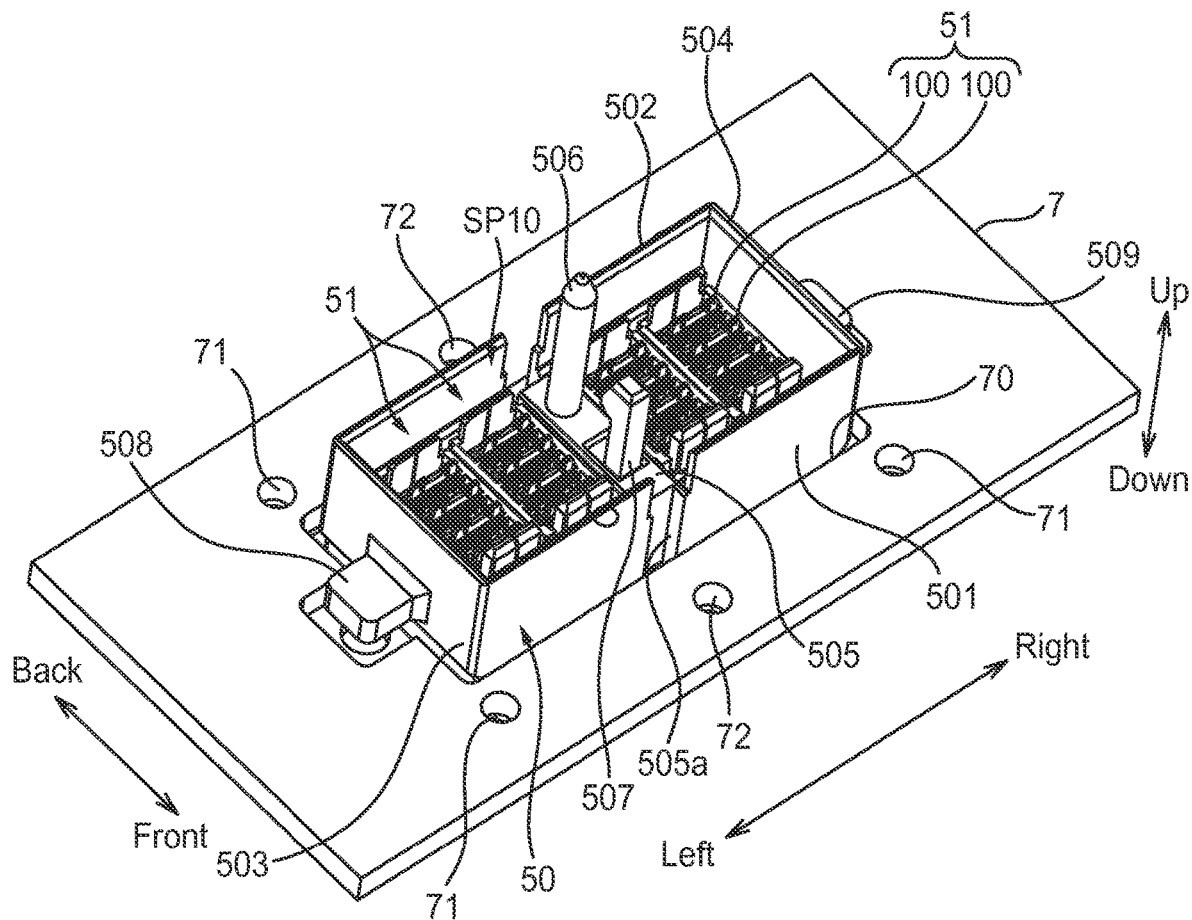
FIG. 11A is a perspective view of one of the optical connectors of FIG. 10.
Figure 11B:
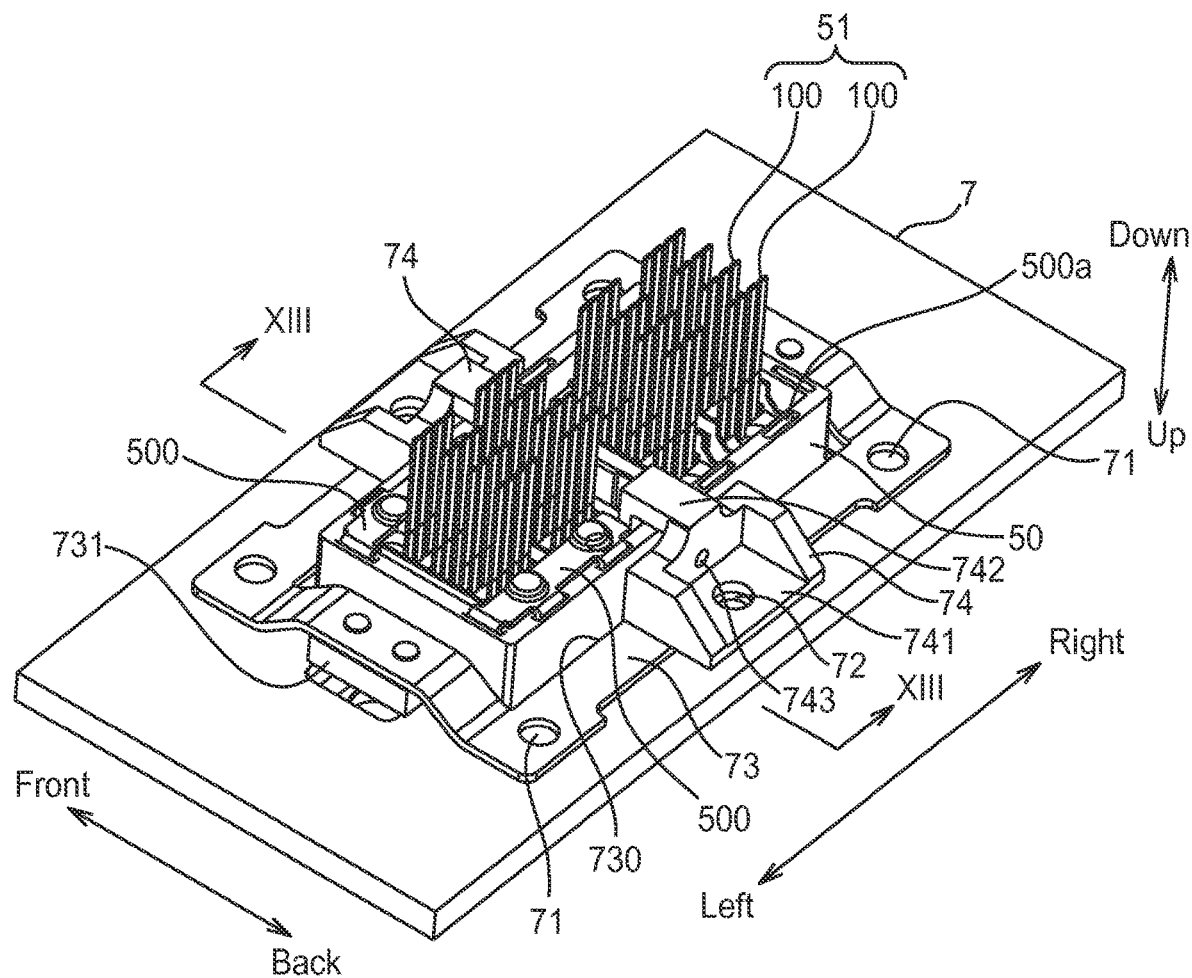
FIG. 11B is a perspective view of one of the optical connectors of FIG. 10.

First, the configuration of the first optical connector 5 is described. FIG. 11A and FIG. 11B are respective perspective views of the first optical connector 5. The first optical connector 5 has a first case 50 that is attached to the first substrate 7 by passing through the first substrate 7, and a plurality of optical fiber assemblies 51 that are housed in the first case 50. The optical fiber assemblies 51 have four rows of optical fiber units 100 in the front-back direction, and four rows of the optical fiber assemblies 51 in the left-right direction are disposed in the first case 50.

Figure 12A:
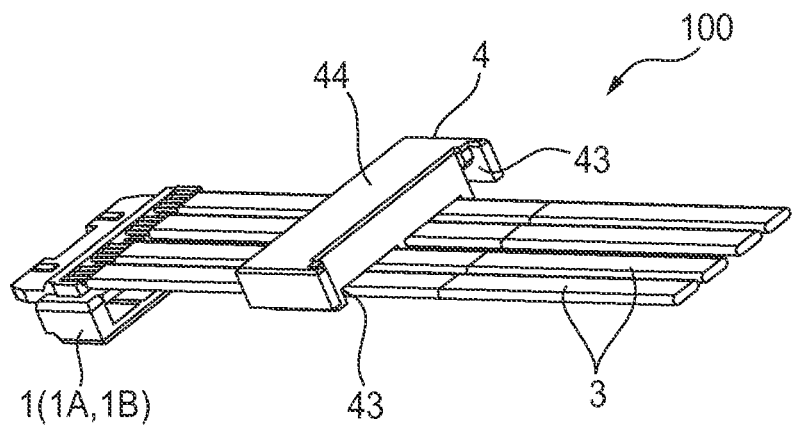
FIG. 12A is a perspective view of an optical fiber unit that is assembled into the optical connector of FIG. 11A.
Figure 12B:
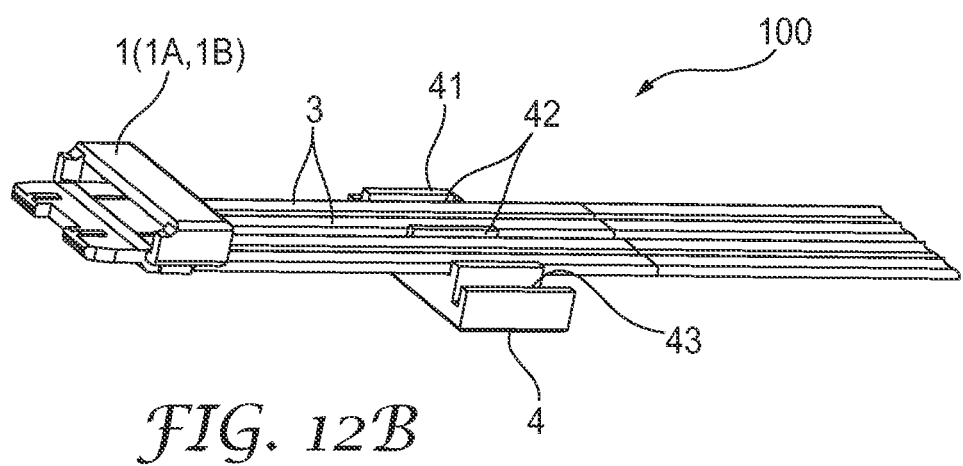
FIG. 12B is a perspective view of an optical fiber unit assembled to the optical connector of FIG. 11A.

FIG. 12A and FIG. 12B are each perspective views of the optical fiber unit 100. Note that the optical fiber units 100 on the first optical connector 5 side and the optical fiber units 100 on the second optical connector 6 side have the same shape. As illustrated in FIG. 12A and FIG. 12B, a securement member 4 that is configured by resin molding is fixed at a position that is separated only at a predetermined distance from the optical ferrules (1A and 1B) on one surface of a plurality of fiber ribbons 3. The securement member 4 extends parallel to the width direction of the optical ferrule 1. A pair of receiving grooves 42 are formed in the width direction on a surface 41 facing the fiber ribbons 3 of the securement member 4, and engaging grooves 43 that are parallel with the receiving grooves 42 are formed on both sides in the width direction of the receiving grooves 42. A pair of fiber ribbons 3 are contained in each of the receiving grooves 42, and the fiber ribbons 3 are fixed to the securement member 4 by an adhesive. Another surface 44 of the securement member 4 is flat.

As illustrated in FIG. 11A, the first case 50 has a front wall 501, a rear wall 502, and left and right side walls 503 and 504 that connect both left and right end parts of the front wall 501 and both left and right end parts of the rear wall 502, and is made by resin molding. The front wall 501, the rear wall 502, and the side walls 503 and 504 extend respectively in the vertical direction, and the first case 50 assumes a frame shape where the upper surface and the lower surface are open. A holding space SP10 for holding the optical fiber assemblies 51 is formed on the inner part of the first case 50.

The first case 50 has a center wall 505 that connects the left and right center part of the front wall 501 and the left and right center part of the rear wall 502, and the holding space SP10 is divided in two in the left-right directions by the center wall 505. A guide pin 506 and a latch 507 protrude upward on the upper surface of the center wall 505. The upper surface of the center wall 505 is positioned more downward than the upper surfaces of the front wall 501 and the rear wall 502, and the bottom surface of the center wall 505 is positioned more upward than the bottom surfaces of the front wall 501 and the rear wall 502. A cutaway is provided facing downward in the left-right direction of the center part on the upper surface of the front wall 501, and a concave part 505a is formed by the cutaway on the front side of the center wall 505.

Collar parts 508 and 509 protruding to the outside in the left-right direction of the center part in the front-back direction are respectively provided on the left surface of the side wall 503 and the right surface of the side wall 504. An opening part 70 corresponding to the external shape of the first case 50 is provided on the first substrate 7, the lower end part of the first case 50 passes through the opening part 70, and the bottom surface of the first case 50 protrudes more downward than the bottom surface of the first substrate 7. Screw holes 71 and 72 are formed around the opening part 70. The screw hole 71 is provided near the corner of the first case 50, and the screw hole 72 is provided in front and behind the center wall 505 of the first case 50.

Figure 13:
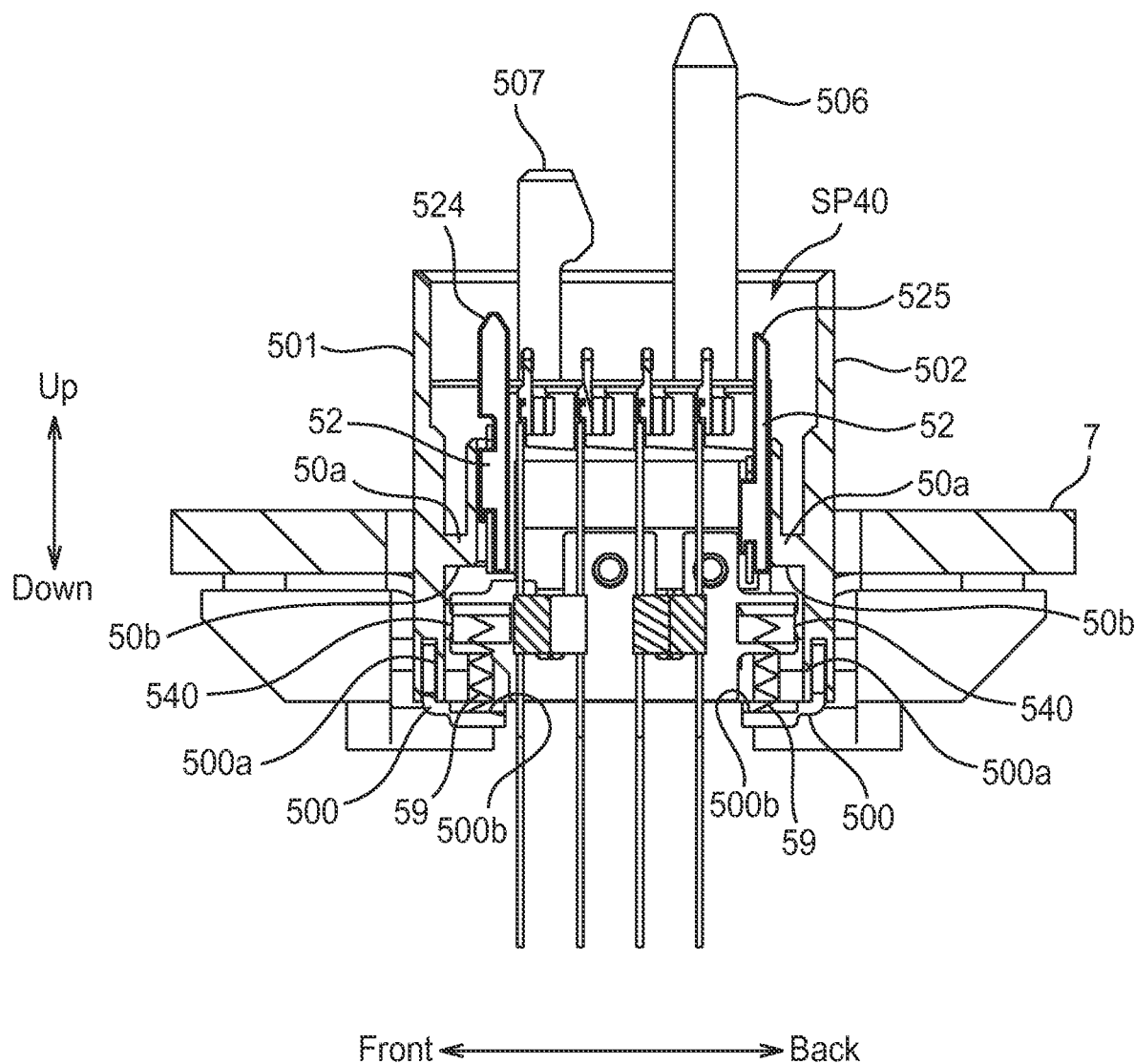
FIG. 13 is a cross-section view along line VIII-VIII in FIG. 11B.

FIG. 13 is a cross-sectional view along line XIII-XIII of FIG. 11B. As illustrated in FIG. 11B and FIG. 13, a slit 500a is provided on the bottom surface of the first case 50, and a metal plate 500 is press fit in the slit 500a. Note that in FIG. 11B, an illustration of the right side of the plate 500 is omitted. The plate 500 extends parallel to the opening of the bottom surface of the first case 50, and the front end part and the rear end part of the opening of the bottom surface of the first case 50 are blocked by the plate 500. A concave part 500b is formed on the upper surface of the plate 500.

A metal supporting plate 73 is attached to the bottom surface of the first substrate 7. The supporting plate 73 is fixed to the first substrate 7 by a screw (not illustrated) that screws into the screw hole 71. The supporting plate 73 has a rectangular opening 730, and the first case 50 is disposed on the inner side of the opening 730. Respective rotating supporting members 74 are disposed in front and behind the center wall 505 of the first case 50. The rotating supporting member 74 has a flange part 741 and an arm part 742, and is made of resin molding.

The flange part 741 of the rotating supporting member 74 is fixed to the first substrate 7 with the supporting plate 73 interposed therebetween by a screw (not illustrated) that is screwed in the screw hole 72. The arm part 742 extends from the flange part 741 over the bottom surface of the first case 50 to the bottom surface of the center wall 505. In other words, the arm part extends such that the front and rear surfaces of the front wall 501 and the front and rear surfaces of the rear wall 502 of the first case 50 are respectively interposed. A pin 743 passes through the front wall 501 and the arm part 742 of the rotating supporting member 74 on the front side, and passes through the rear wall 502 and the arm part 742 of the rotating supporting member 74 on the rear side, in the front-back direction. Therefore, the lower end part of the first case 50 is supported in a manner that can tilt from the first substrate 7 with the pin 743 acting as a fulcrum.

Both left and right end parts of the supporting plate 73 are bent downward away from the bottom surface of the first substrate 7 in the front-back direction of the center part, and a spring shoe 731 is fixed to the upper surface of the supporting plate 73. A coil spring (not illustrated) is interposed between the spring shoe 731 and the collar parts 508 and 509 of the first case 50. Therefore, the elastic force due to the coil spring is applied to both left and right end parts of the first case 50 from the first substrate 7 through the collar parts 508 and 509 and the supporting plate 73, and the first case 50 is elastically supported in a manner that can tilt from the first substrate 7 by a floating mechanism.

Figure 14A:
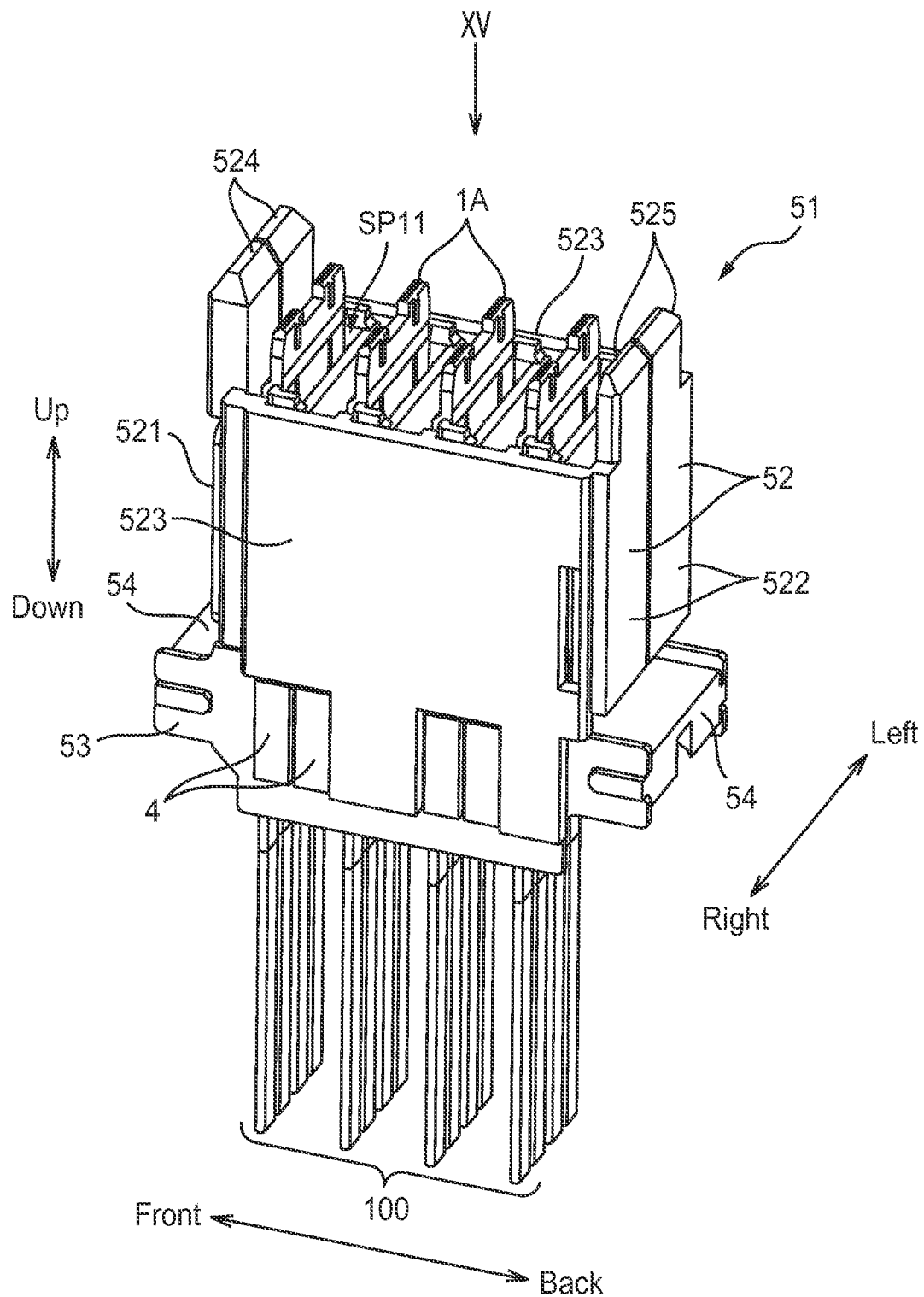
FIG. 14A is a perspective view of an optical fiber assembly held in a case of the connector of FIG. 11A.
Figure 14B:
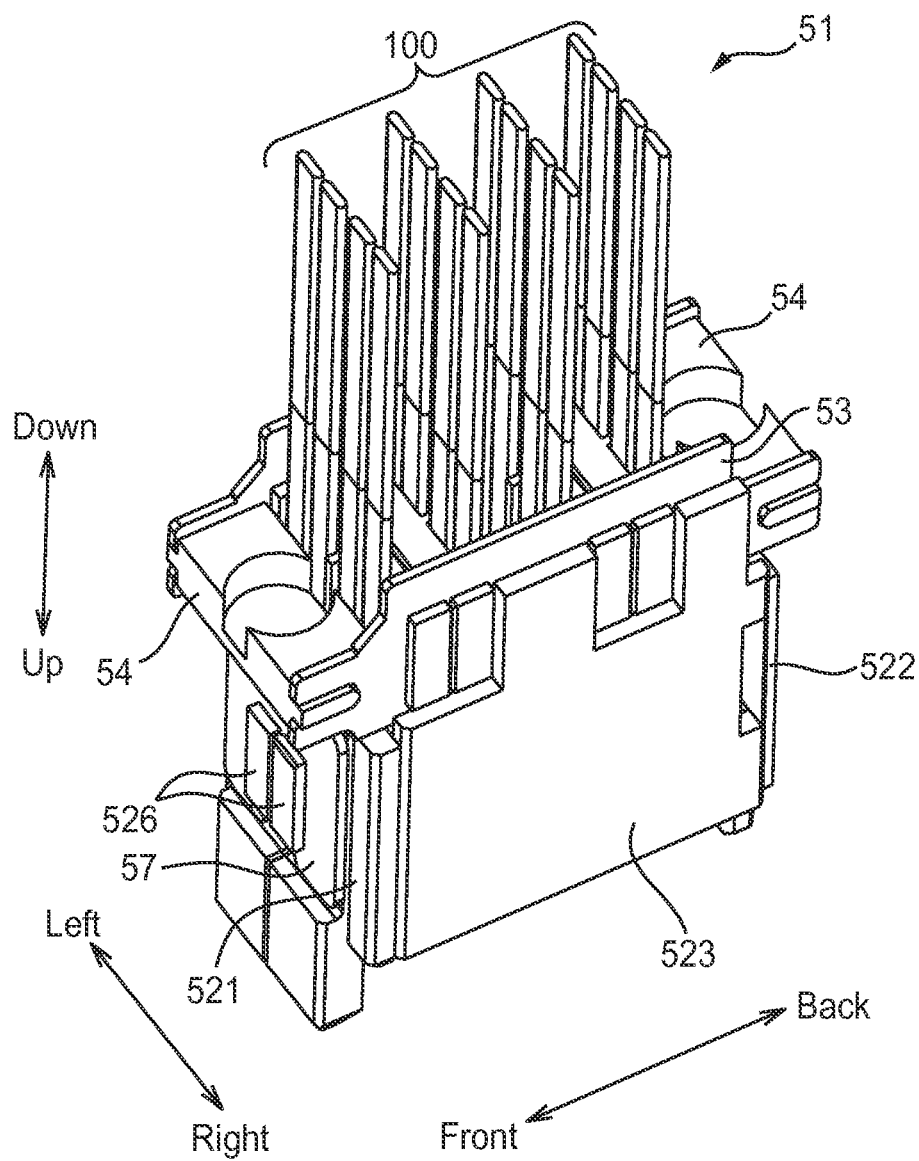
FIG. 14B is a perspective view of an optical fiber assembly held in a case of the connector of FIG. 11A.

FIG. 14A and FIG. 14B are respective perspectives views of the optical fiber assembly 51 that is housed in the first case 50. The optical fiber assembly 51 contains: a left and right pair of bodies 52 that enclose four sets of optical fiber units 100; a left and right pair of plate members 53 that are respectively fixed to the lower end parts of the left and right pair of bodies 52; and a front and rear pair of spring shoes 54 that are attached to both front and rear end parts of the plate members 53. The body 52 on the right side and the body 52 on the left side, as well as the plate member 53 on the right side and the plate member 53 on the left side are symmetrical to each other on the left and right. The spring shoe 54 on the front side and the spring shoe 54 on the rear side are symmetrical in the front and back. The bodies 52 and the spring shoes 54 are made by resin molding. The plate member 53 is made of a metal plate.

Figure 15:
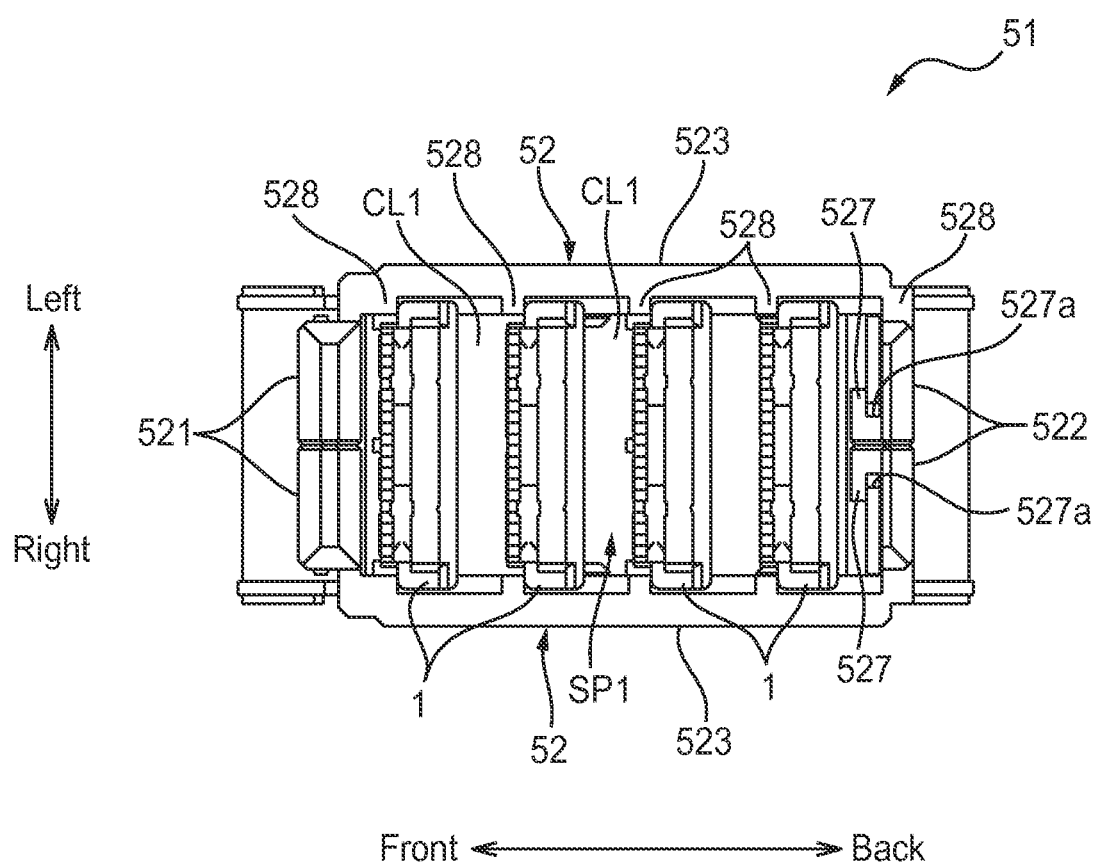
FIG. 15 is a view in the direction of arrow XV in FIG. 14A.

FIG. 15 is a view (plan view) in the direction of arrow XV of FIG. 14. As illustrated in FIG. 15, the body 52 has a front wall 521, a rear wall 522, and a side wall 523 that connects the front wall 521 and the rear wall 522, and assumes a C-shape from a plan view. As illustrated in FIG. 14A, protruding parts 524 and 525 that protrude more upward than the side wall 523 are formed on the upper end part of the front wall 521 and the upper end part of the rear wall 522. The protruding part 524 has increased thickness and rigidity toward the front. The protruding part 524 protrudes further upward than the protruding part 525 (refer to FIG. 13).

Figure 16A:
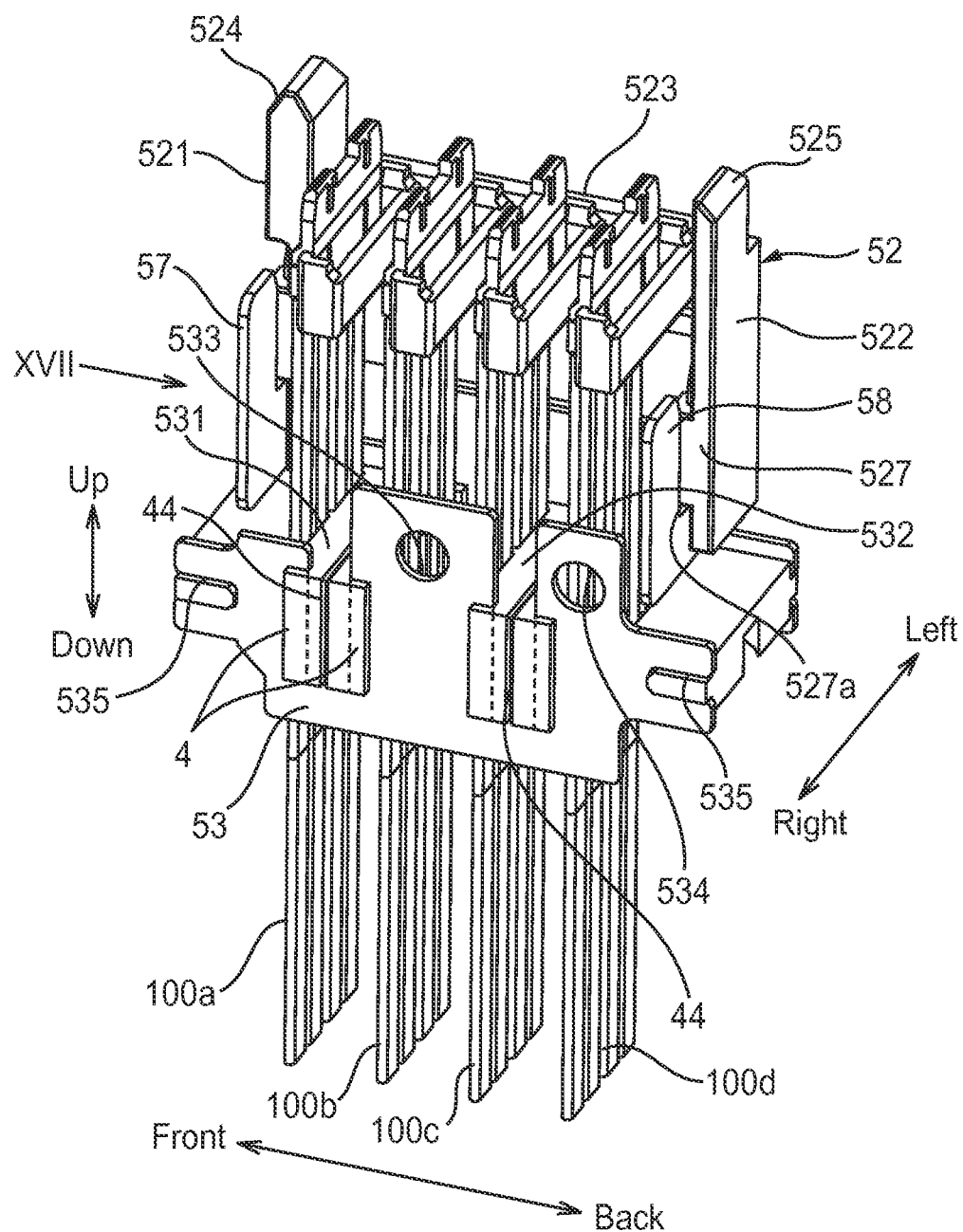
FIG. 16A is a perspective view where the right side body has been omitted from the optical fiber assembly of FIG. 14A.
Figure 16B:
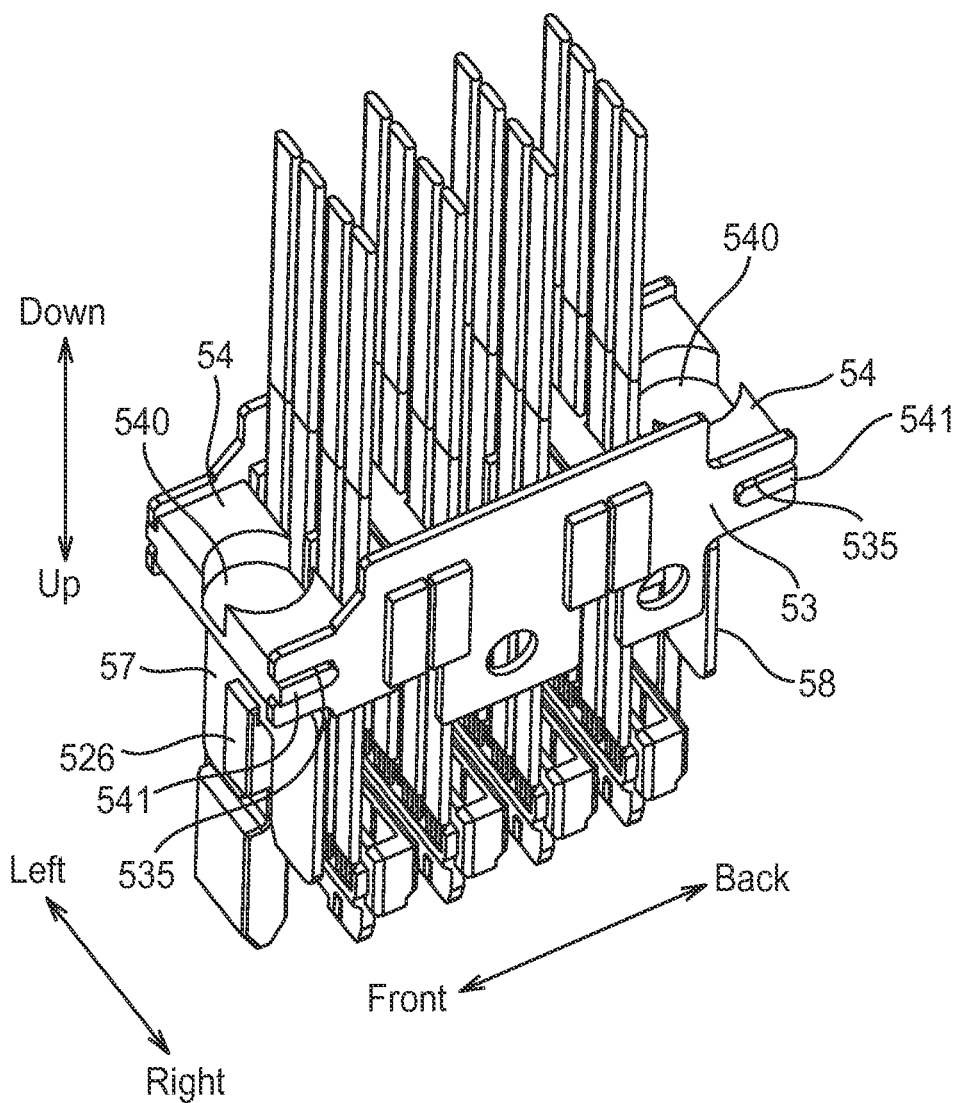
FIG. 16B is a perspective view where the right side body has been omitted from the optical fiber assembly of FIG. 14B.
Figure 17:
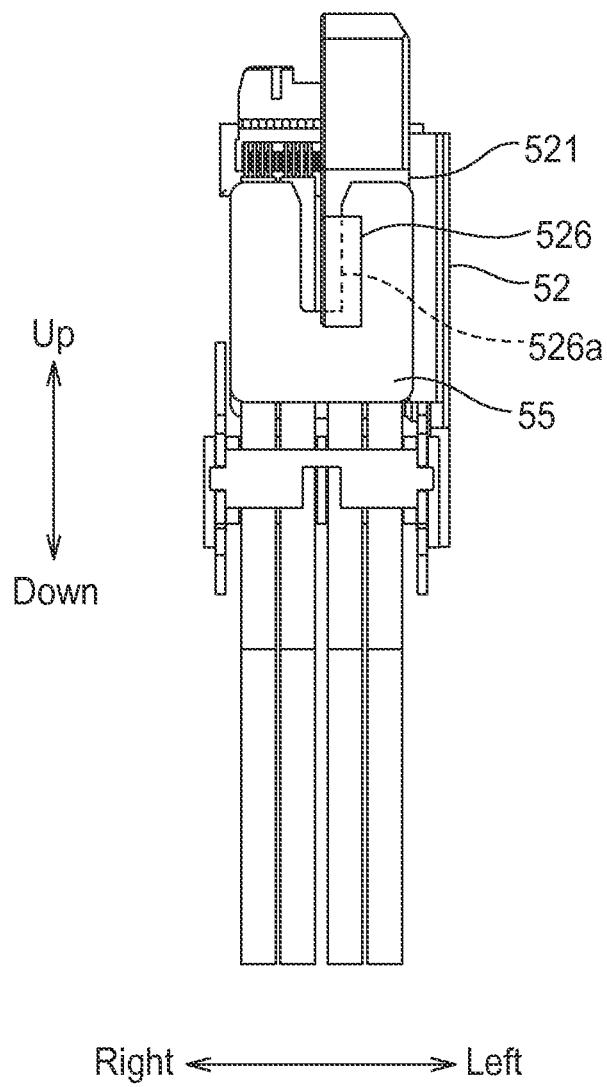
FIG. 17 is a view in the direction of arrow XVII in FIG. 16A.

FIG. 16A and FIG. 16B are respective perspective views that omit the right side body 52 from the optical fiber assembly 51 of FIG. 14A and FIG. 14B, and FIG. 17 is a view (front surface view) in the direction of arrow XVII of FIG. 16A. As illustrated in FIG. 17, a protruding part 526 that protrudes forward is provided on the front surface of the front wall 521 of the body 52. An engaging groove 526a is formed on the circumference surface of the protruding part 526 (right end surface and lower end surface of the protruding part 526 of the body 52 on the right side, and the left end surface and the lower end surface of the protruding part 526 of the body 52 on the left side). A U-shaped clip 57 made from a metal plate of a predetermined thickness is engaged from the lower side in the engaging grooves 526a of the left and right bodies 52, and the front end parts of the left and right bodies 52 are connected through the clip 57.

As illustrated in FIG. 15 and FIG. 16A, a protruding part 527 that protrudes forward is provided on the front surface of the rear wall 522 of the body 52. An engaging groove 527a is formed on the circumference surface of the protruding part 527 (right end surface and lower end surface of the protruding part 527 of the body 52 on the right side, and the left end surface and the lower end surface of the protruding part 527 of the body 52 on the left side). A U-shaped clip 58 made from a metal plate of a predetermined thickness is engaged from the lower side in the engaging grooves 527a of the left and right bodies 52, and the rear end parts of the left and right bodies 52 are connected through the clip 58. Therefore, as illustrated in FIG. 15, a holding space SP11 of the optical fiber units 100 is formed on the inner side of the left and right bodies 52. Note that the clip 57 and the clip 58 have the same shape.

A plurality of position regulating parts 528 that protrude toward the holding space SP11 are provided at equal intervals in the front back direction on the inner wall surface of the side wall 523 of the body 52. The front end surfaces (both left and right end parts of the upper wall 10 in FIG. 1) of the optical ferrule 1 are respectively in contact with the position regulating part 528, and a gap CL1 is provided between the rear end surface of the optical ferrule 1 and the position regulating part 528 to the back thereof. Thereby, the optical ferrule 1 can be moved rearward.

As illustrated in FIG. 16A, of the four rows of optical fiber units 100 in the front-back direction, the securement member 4 is fixed on the rear end surface of the fiber ribbons 3 for the first and third rows of optical fiber units 100a and 100c, and the securement member 4 is fixed on the front end surface of the fiber ribbons 3 for the second and fourth rows of optical fiber units 100b and 100d. Therefore, the flat surfaces 44 of the first and second rows of optical fiber units 100a and 100b face each other, and the flat surfaces 44 of the third and fourth rows of optical fibers units 100c and 100d face each other.

A front and rear pair of grooves with bottoms 531 and 532 are formed facing downward on the upper end surface of the plate member 53. The end part of the securement members 4 of the optical ferrule units 100a and 100b, in other words, the engaging groove 43 in FIG. 12A is inserted from above into the groove with bottom 531 on the front side, and the engaging grooves 43 of the optical ferrule units 100a and 100b are respectively engaged in the front wall and the rear wall of the groove with bottom 531. Similarly, the end parts (engaging groove 43) of the securement members 4 of the optical ferrule units 100c and 100d are inserted from above into the groove with bottom 532 on the rear side, and the engaging grooves 43 of the optical ferrule units 100c and 100d are respectively engaged in the front wall and the rear wall of the groove with bottom 532. Thereby, the securement members 4 of the optical ferrule units 100a through 100d are fixed to the plate member 53.

The plate member 53 protrudes upward between the grooves with bottom 531 and 532 and behind the groove with bottom 532, and through holes 533 and 534 are opened on the protruding part. An illustration is omitted, but a convex part is provided corresponding to the through holes 533 and 534 on the inner wall surface of the side wall 523 of the body 52. The convex part of the body 52 is mated to the through holes 533 and 534 of the left and right plate members 53 from the outside on the left and right, and the left and right bodies 52 are fixed to the left and right plate members 53 by engaging the clips 57 and 58 from below.

The front end part and the rear end part of the plate member 53 protrude further forward and rearward than the front wall 521 and the rear wall 522 of the body 52. Engaging grooves 535 are formed facing rearward and forward respectively on the front end surface and the rear end surface of the protruding part. As illustrated in FIG. 16B, circular concave parts 540 are formed on the left and right of the center part on the bottom surface of the spring shoe 54. A protruding part 541 that protrudes in the left-right direction corresponding to the engaging groove 535 of the plate member 53 is provided on both left and right end parts of the spring shoe 54. The plate member 53 and the spring shoe 54 are integrated by engaging the protruding part 541 of the spring shoe 54 from the outside in the left-right directions to the groove with bottom 535. Thereby, the optical fiber assemblies 51 can be assembled.

As illustrated in FIG. 13, respective step parts 50a are provided on the rear surface of the front wall 501 and the front surface of the rear wall 502 of the first case 50, and the length in the front-back direction of the holding space SP10 is reduced on the upward side more than the step part 50a. The distance from the rear end surface of the step part 50a on the front side to the front end surface of the step part 50a on the rear side is equal to the distance from the front end surface to the rear end surface of the body 52 of the optical fiber assembly 51. Therefore, the position in the front-back direction of the body 52 in the first case 50 is regulated.

Note that an illustration is omitted, but respective step parts 50a are also provided on the right surface of the side wall 503 and the left surface of the side wall 504 of the first case 5, and are joined to the step parts 50a of the front wall 501 and the rear wall 502. The distance from the step part 50a of the side walls 503 and 504 to the left and right inner side surfaces of the center wall 505 is equal to the distance between the left and right outer side surfaces of a pair of optical fiber assemblies 51 when the pair of optical fiber assemblies 51 is disposed on the left and right between the side walls 503 and 504 and the center wall 505 as illustrated in FIG. 11A. Thereby, the position in the left-right direction of the body 52 in the first case 50 is regulated.

As illustrated in FIG. 13, a coil spring 59 is interposed between a concave part 540 on the bottom surface of the spring shoe 54 of the optical fiber assembly 51, and a concave part 50b of a plate 500 that is mounted on the bottom surface of the first case 50, and the optical fiber assembly 51 can be raised and lowered against the biasing force of the coil spring 59. FIG. 13 illustrates a position of the optical fiber assembly 51 after mating the first optical connector 5 to the second optical connector 6, and the spring shoe 54 is positioned lower than the bottom surface 50b of the step part 50a. Before mating the first optical connector 5, the spring shoe 54 is biased upward by the spring 59, and contacts the bottom surface 50b of the step part 50a. Therefore, upward movement of the optical fiber assembly 51 is restricted, and the maximum raised position of the optical fiber assembly 51 in the first case 50 is regulated.

Figure 18A:
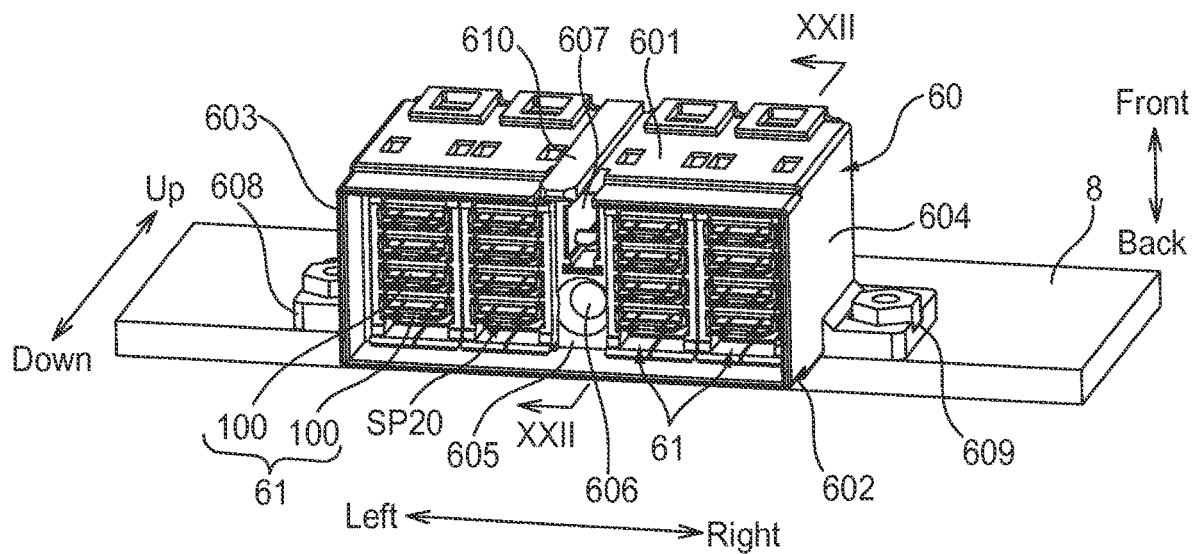
FIG. 18A is a perspective view of another optical connector of FIG. 10.
Figure 18B:
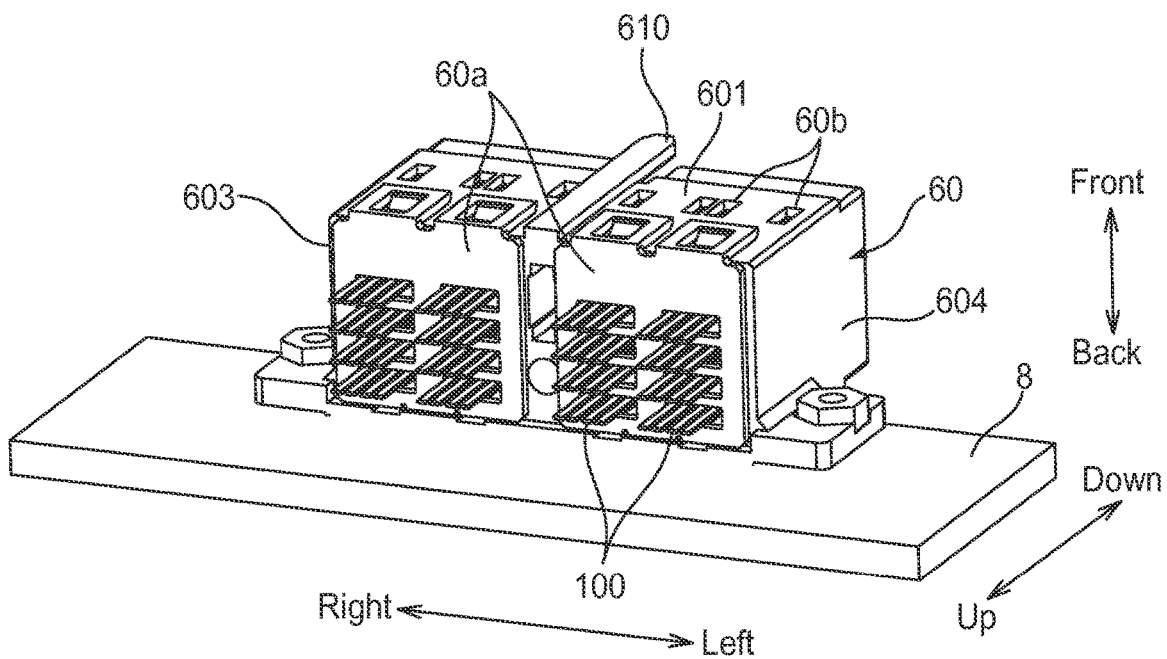
FIG. 18B is a perspective view of another optical connector of FIG. 10.

Next, the configuration of the second optical connector 6 is described. FIG. 18A and FIG. 18B are perspective views of the second optical connectors 6. The second optical connector 6 has a second case 60 attached to a second substrate 8, and a plurality of optical fiber assemblies 61 that are housed in the second case 60. The optical fiber assemblies 61 have four rows of optical fiber units 100 in the front-back direction, and four rows of optical fiber assemblies 61 are disposed in the left-right direction in the second case 60.

The second case 60 has a front wall 601, a rear wall 602, and left and right side walls 603 and 604 that connect both left and right end parts of the front wall 601 and both left and right end parts of the rear wall 602, and is made by resin molding. The front wall 601, the rear wall 602, and the side walls 603 and 604 respectively extend in the vertical direction, and the second case 60 assumes a frame shape where the upper surface and the lower surface are open. A holding space SP20 for holding the optical fiber assemblies 61 is formed on the inner part of the second case 60. A left and right pair of covers 60a are mounted on the upper surface of the second case 60, and the optical fiber unit 100 extends upward passing through the cover 60a.

The second case 60 has a center wall 605 that connects the left and right center part of the front wall 601 and the left and right center part of the rear wall 602, and the holding space SP20 is divided in two in the left-right directions by the center wall 605. A pin hole 606 that engages the guide pin 506 (FIG. 11A) of the first case 50, and a latch hole 607 that engages the latch 507 (FIG. 11A) are drilled in the lower surface of the center wall 605. Flange parts 608 and 609 protrude respectively in the left and right directions on the rear end and upper end parts of the side walls 603 and 604, and the second case 60 is fastened to the second substrate 8 by a bolt that passes through the flange parts 608 and 609.

A rectangular through hole 60b is formed on the front wall 601 and the rear wall 602, corresponding to the position of slanted parts 67a and 68a (FIG. 19A and FIG. 19B) of the clips 67 and 68 of the optical fiber assembly 61. A long narrow guide part 610 with a constant width in the left-right direction extends in the vertical direction to the front surface of the front wall 601. The lower end part of the guide part 610 protrudes further downward than the lower end surface of the front wall 601 (refer to FIG. 22). The length in the front-back direction of the lower end part of the outer wall surface of the second case 60 is shorter than the length in the front-back direction of the inner wall surface above the first case 50, and the length in the left-right direction of the lower end part of the outer wall surface of the second case 60 is shorter than the length in the left-right direction of the inner wall surface of the first case 50.

Therefore, the second case 60 can be inserted in the first case 50, and as illustrated in FIG. 10, when the lower end part of the second case 60 is inserted in the first case 50, a guide part 610 of the second case 60 is inserted in the concave part 505a the first case. At the same time, the guide pin 506 of the first case 50 is inserted in the pin hole 606 of the second case 60, and the second case 60 is positioned in the first case 50. Furthermore, the latch 507 of the first case 50 is engaged in the latch hole 607 of the second case 60, and the second case 60 is connected to the first case 50.

Figure 19A:
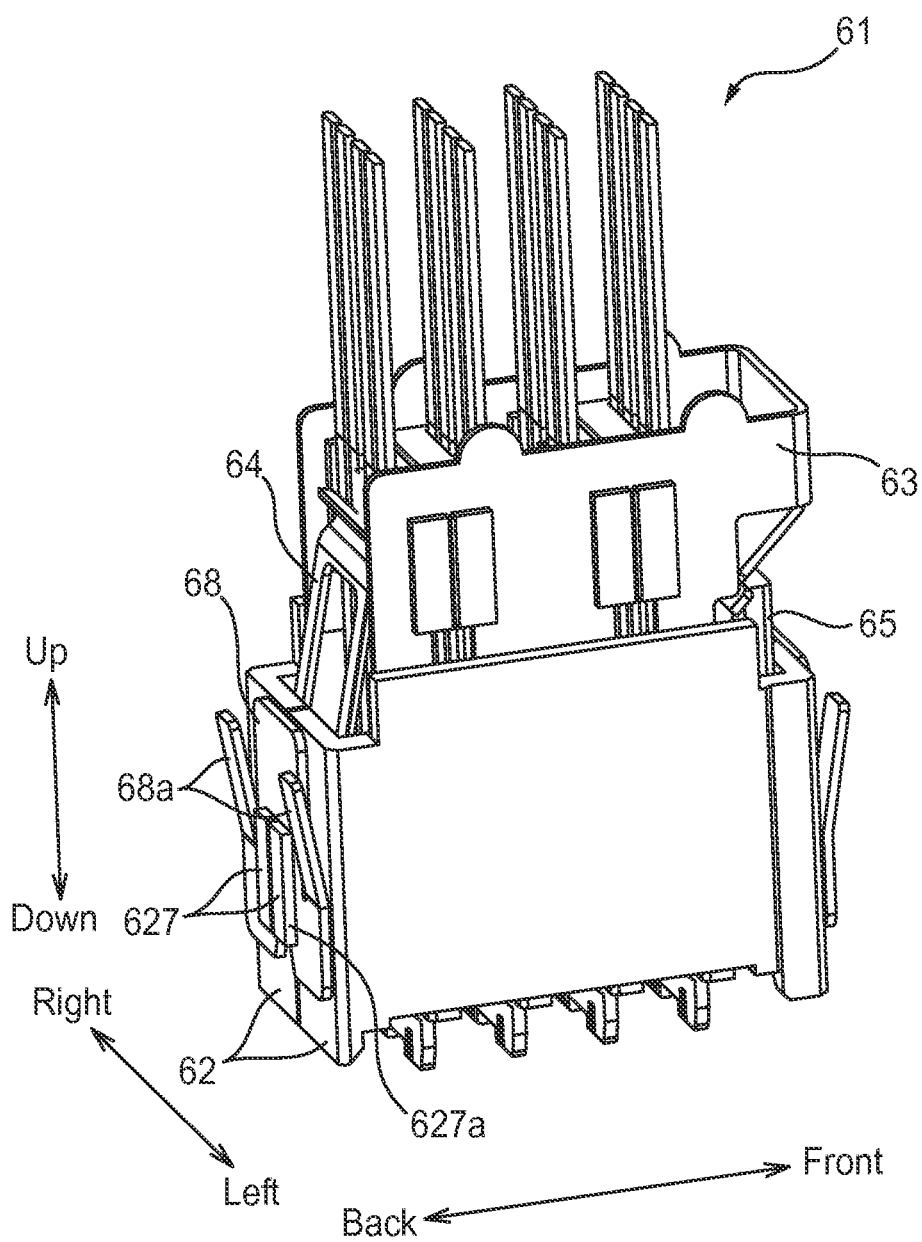
FIG. 19A is a perspective view of an optical fiber unit assembled into the optical connector of FIG. 18A.
Figure 19B:
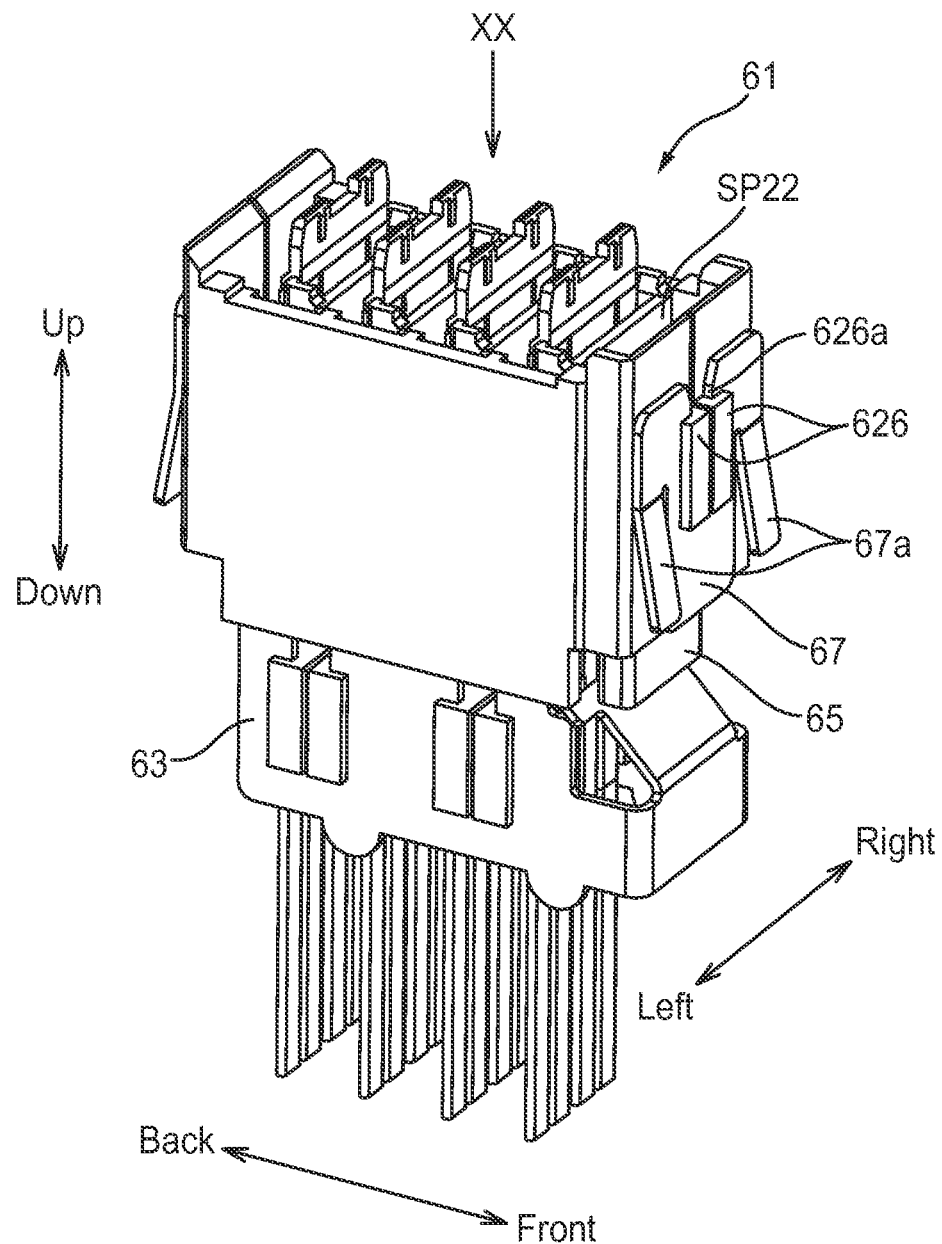
FIG. 19B is a perspective view of the optical fiber unit incorporated into the optical connector of FIG. 18A.

FIG. 19A and FIG. 19B are respective perspective views of the optical fiber assembly 61 that is housed in the second case 60. The optical fiber assembly 61 contains: a left and right pair of bodies 62 that enclose four optical fiber units 100; a plate member 63 that is fixed to the upper end part of the left and right pair of bodies 62; a plate spring member 64 that is supported on the rear end part of the left and right pair of bodies 62; and a pressing member 65 that is supported on the front end part of the left and right pair of bodies 62. The body 62 on the right side and the body 62 on the left side are symmetrical to each other on the left and right. The plate member 63, the plate spring member 64, and the pressing member 65 are symmetrical to each other on the left and right. The body 62 and the pressing member 65 are made by resin molding. The plate member 63 and the plate spring member 64 are made of a metal plate.

Figure 20:
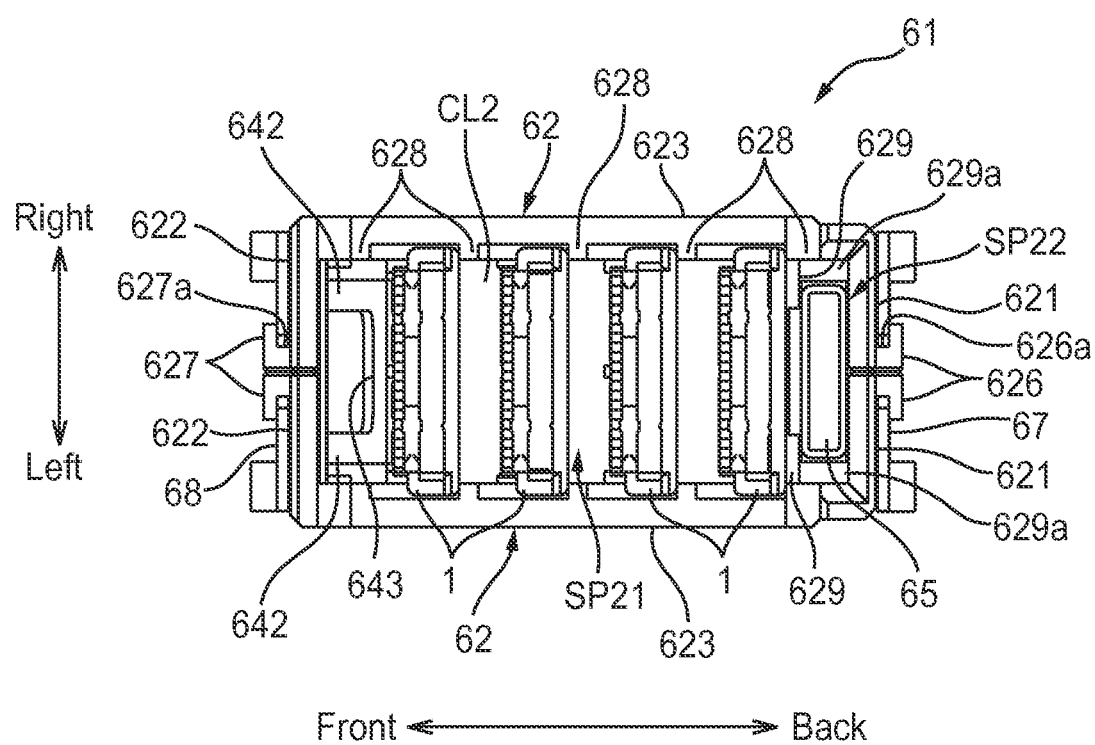
FIG. 20 is a view in the direction of arrow XX of FIG. 19B.

FIG. 20 is a view (plan view) in the direction of arrow XX of FIG. 19B. As illustrated in FIG. 20, the body 62 has a front wall 621, a rear wall 622, and a side wall 623 that connects the front wall 621 and the rear wall 622, and assumes a C-shape from a plan view. As illustrated in FIG. 19B and FIG. 20, a protruding part 626 that protrudes forward is provided on the front surface of the front wall 621. An engaging groove 626a is formed on the circumference surface of the protruding part 626 (right end surface and lower end surface of the protruding part 626 of the body 62 on the right side, and the left end surface and the lower end surface of the protruding part 626 of the body 62 on the left side). A U-shaped clip 67 made from a metal plate of a predetermined thickness is engaged downward in the engaging grooves 626a of the left and right bodies 62, and the front end parts of the left and right bodies 62 are connected through the clip 67. A slanted part 67a that protrudes forward at a slant is provided on both left and right end parts of the clip 67.

As illustrated in FIG. 19A and FIG. 20, a protruding part 627 that protrudes rearward is provided on the rear surface of the rear wall 622. An engaging groove 627a is formed on the circumference surface of the protruding part 627 (right end surface and lower end surface of the protruding part 627 of the body 62 on the right side, and the left end surface and the lower end surface of the protruding part 627 of the body 62 on the left side). A U-shaped clip 68 made from a metal plate of a predetermined thickness is engaged downward in the engaging grooves 627a of the left and right bodies 62, and the rear end parts of the left and right bodies 62 are connected through the clip 68. A slanted part 68a that protrudes rearward at a slant is provided on both left and right end parts of the clip 68. Therefore, as illustrated in FIG. 20, the holding space SP21 of the optical fiber units 100 is formed on the inner side of the left and right bodies 62. Note that the clip 67 and the clip 68 have the same shape.

A plurality of position regulating parts 628 that protrude toward the holding space SP21 are provided at equal intervals in the front back direction on the inner wall surface of the side wall 623 of the body 62. The front end surface (both left and right end parts of the upper wall 10 in FIG. 10) of the optical ferrule 1 are in contact with the position regulating part 228, and a gap CL2 is provided between the rear end surface of the optical ferrule 1 and the position regulating part 628 to the back thereof. Thereby, the optical ferrule 1 can be moved rearward. A partition wall 629 protrudes in the left-right direction on the inner side from the position regulating part 628 of the foremost part, and a holding space SP22 is formed between the partition wall 629 and the front wall 621. The pressing member 65 is housed in the holding space SP22.

Figure 21A:
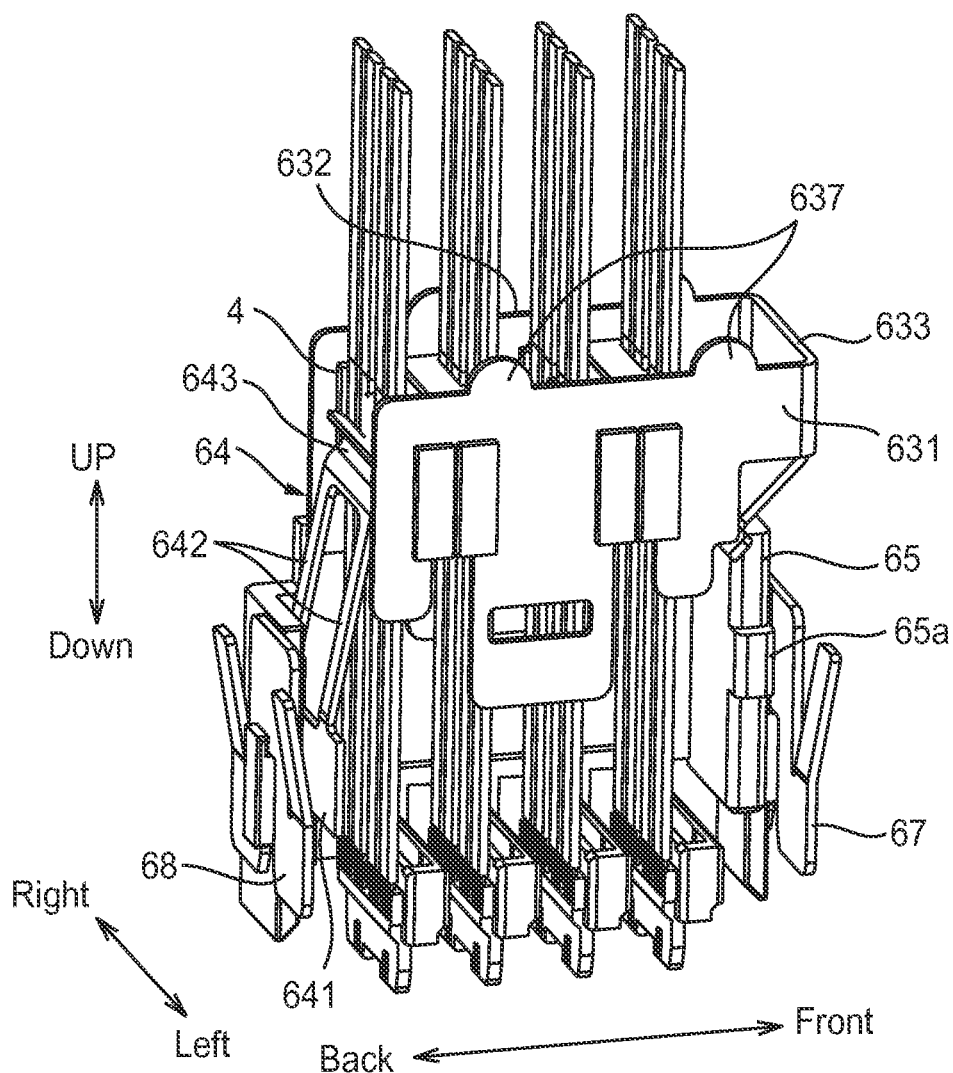
FIG. 21A is a perspective view where the left side body has been omitted from the optical fiber assembly of FIG. 19A.
Figure 21B:
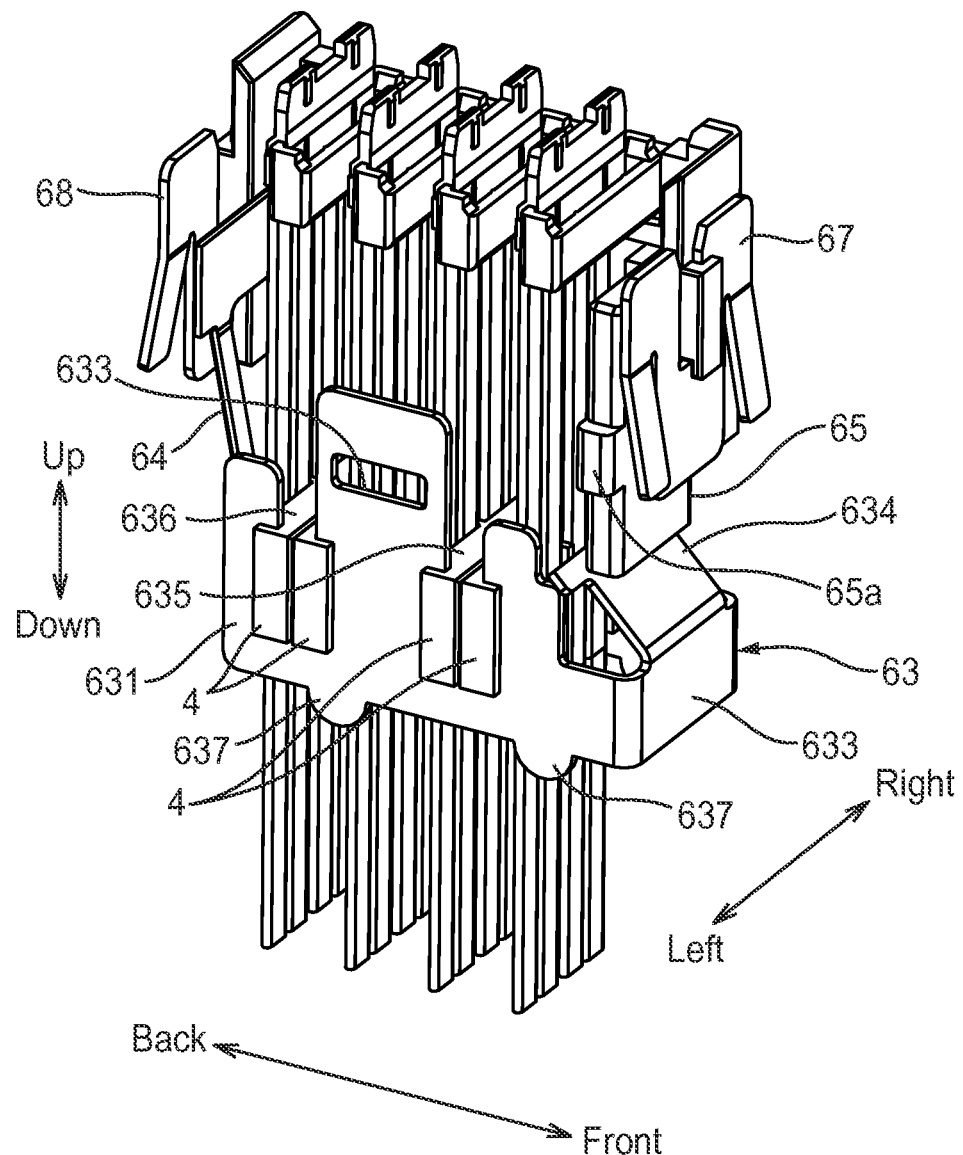
FIG. 21B is a perspective view where the left side body has been omitted from the optical fiber assembly of FIG. 19B.

FIG. 21A and FIG. 21B are respective perspective views that omit the left side body 62 from the optical fiber assembly 61 of FIG. 19A and FIG. 19B. As illustrated in FIG. 21B, the protruding part 65a protrudes on both left and right end parts of the pressing member 65. As illustrated in FIG. 20, a stopper part 629a is formed facing the upper end surface of the protruding part 65a between the front wall 621 and partition wall 629 of the body 62. Upward movement of the pressing member 65 is limited due to the protruding part 65a contacting the stopper 629a.

As illustrated in FIG. 21A, the plate spring member 64 has a rectangular base part 641, and an arm part 642 that extends at an angle forward and upward from the base part 641, and an arc shaped pressing part 643 is formed on the tip of the arm part 642. The arm part 642 includes a pair of left and right beam members for increasing the spring properties. Although an illustration is omitted, a concave part that mates with the upper and lower angle part of the right side and the upper and lower angle part of the left side of the base part 641 is formed in the rear wall 622 of the left and right bodies 62. Therefore, when the left and right bodies 62 are joined, the angle part of the base part 641 mates with the concave part, and the base part 641 is secured to the rear wall 622. At this time, the pressing part 643 of the plate spring member 64 applies a bias in the forward direction on the back end surface of the securement member 4 of the optical ferrule unit 100. Therefore, as illustrated in FIG. 20, the optical ferrule 1 is pushed forward, and contacts the position regulating part 628.

As illustrated in FIG. 21A and FIG. 21B, the plate material 63 has left and right side walls 631 and 632 and a front wall 633 that is connected to the front end part of the left and right side walls 631 and 632. The lower end surfaces of the side walls 631 and 632 are provided with grooves with bottoms 635 and 636 similar to the optical fiber assembly 51 (FIG. 16A) of the first optical connector 5. The engaging groove 43 of the securement member 4 of the optical ferrule unit 100 (FIG. 12B) engages with the front wall and the rear wall of the grooves with bottoms 635 and 636, and the securement member 4 of the optical ferrule unit 100 is secured to the plate member 63. A front and back pair of semicircular shaped protruding parts 637 are provided on the upper end surface of the side walls 631 and 632. A slanted part 634 that slants upward and backward extends from the upper end surface of the front wall 633 of the plate member 63. A lower end surface of a pressing member 65 abuts the upper surface of the slanted part 634.

The plate member 63 protrudes upward between the grooves with bottoms 631 and 632, and an elongated hole 633 elongated in the front and back direction is formed in the protruding part. A convex part 625 (FIG. 22) corresponding to the elongated hole 633 is provided in the side wall surface of the side wall 623 of the body 62. The height in the vertical direction of the convex part 625 is almost equal to the height of the elongated hole 633, and the length in the front back direction of the convex part 625 is shorter than the length of the elongated hole 633. When the left and right bodies 62 are linked by clips 67 and 68, the convex part 625 of the body 62 mates with the elongated holes 633 of the left and right plate members 63 from the outer sides in the left and right direction. The concave part 625 can slide in the front and back direction along the elongated hole 633, and therefore the left and right bodies 62 are connected so as to be moveable in the front and back direction to the plate member 63. Thereby the optical fiber assembly 61 is assembled.

Figure 22:
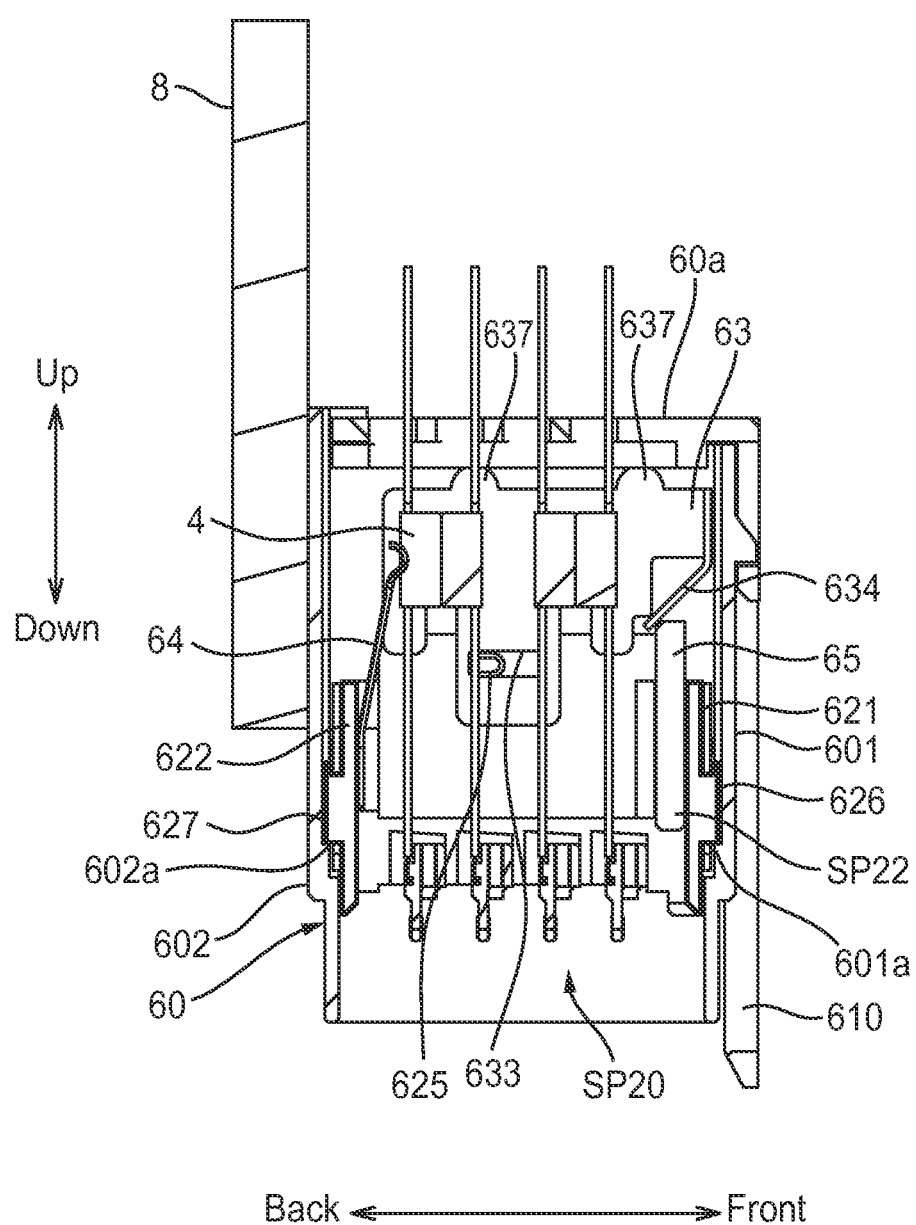
FIG. 22 is a cross-section view cut along line XXII-XXII of FIG. 18A.

FIG. 22 is a cross-section view cut along line XXII-XXII in FIG. 18A. As illustrated in FIG. 22, step parts 601a and 602a are provided on the front surface of the rear wall 602 and the back surface of the front wall 601 of the second case 60, and the length in the front and back direction of the holding space SP20 is narrower toward the bottom of the step parts 601a and 602a. When the optical fiber assembly 61 is inserted from above the second case 60, the lower end surface of the protruding parts 626 and 627 will abut the upper surface of the step parts 601a and 602a, and thus downward movement of the optical fiber assembly 61 is limited. At this time, the tips of the slanted parts 67a and 68a of the clips 67 and 68 are inserted into the opening part 60*b* (FIG. 18B) of the optical connectors 60, and thus upward movement of the optical fiber assembly 61 is also limited.

The length from the front end surface to the back end surface of the body 62 of the optical fiber assembly 61 is equal to the length from the back surface of the front wall 601 to the front surface of the rear wall 602 of the second case 60 above the step parts 601*a* and 602*a*. Thereby, the position of the body 62 in the second case 60 is regulated. In this case, the convex part 625 of the body 62 mates with the elongated hole 633 in the front and back direction of the plate member 63, and the plate member 63 can move back against the biasing force of the plate spring member 64 while the protruding part 637 of the upper end surface of abuts the bottom surface of the cover 60*a*. Note that as illustrated in FIG. 18A, when the pair of optical fiber assemblies 61 is positioned between the side walls 603 and 604 and the center wall 605 of the second case 60, the distance between the left and right outer side surfaces of the pair of optical fiber assemblies 61 is equal to the distance from the left right inner side surfaces of the side walls 603 and 604 of the second case 60 to the center wall 605. Therefore, the position in the left and right direction of the body 62 in the second case 60 is regulated.

Figure 23:
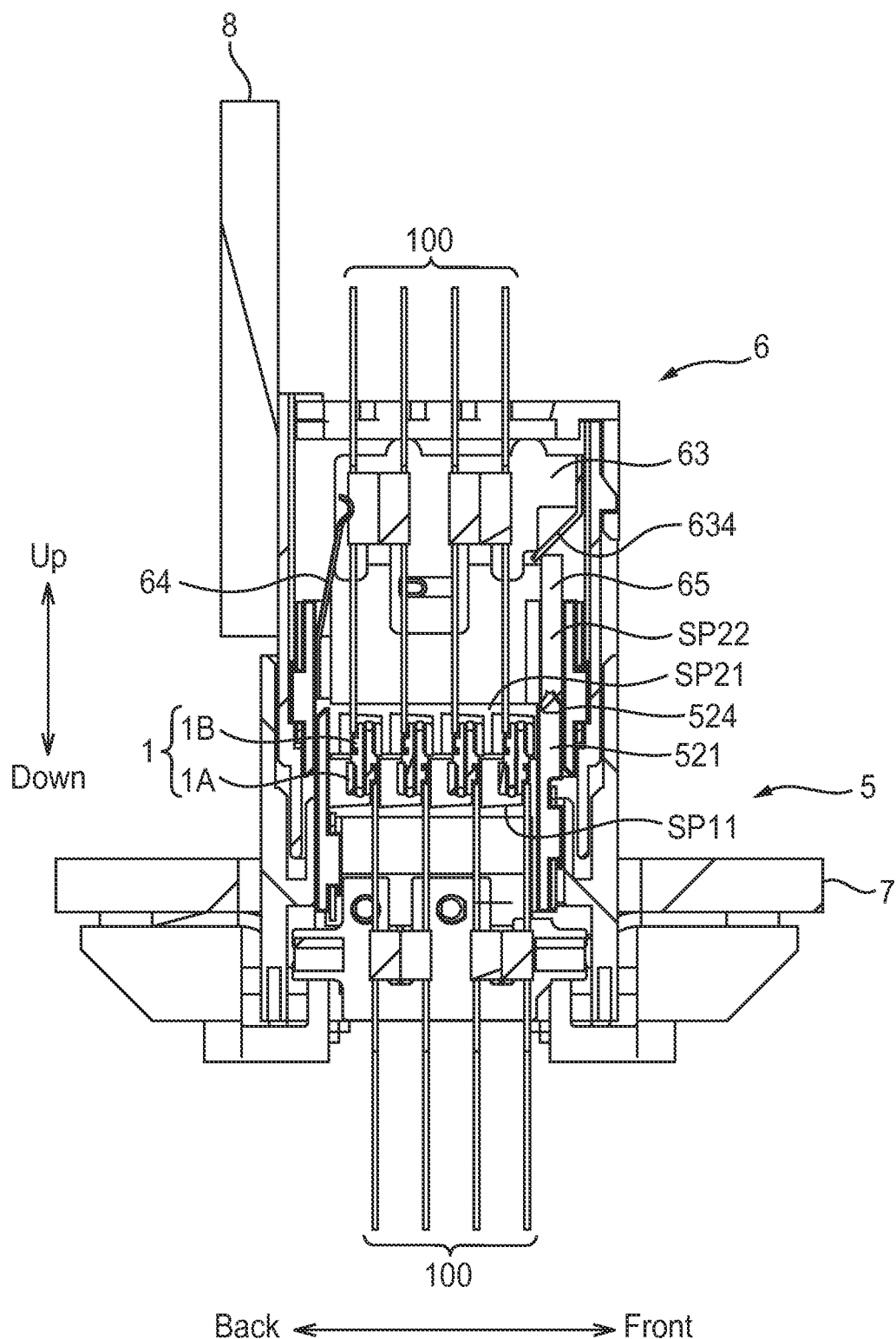
FIG. 23 is a cross-section view showing the mated condition of the connector according to an embodiment of the present invention.

The action when mating the optical connectors 5 and 6 will be described. For example, when the second optical connector 6 is pressed to the first optical connector 5, the position is determined by the guide pin 506 (FIG. 11A) and the guide part 610 (FIG. 18A), while at the same time, as illustrated in FIG. 23, the protruding part 524 on the front wall upper end part of the body 52 of the first optical connector 5 is inserted into the holding space SP22 of the back part of the front wall of the body 62 of the second optical connector 6, and the tip of the protruding part 524 contacts the lower end part of the pressing member 65. When the second optical connector 6 is pressed further, the protruding part 524 presses the pressing member 65 upward, and thus a pushing force in the back direction is applied to the plate member 63 through the slanted part 634. Therefore, the plate member 63 moves rearward against the biasing force of the plate spring member 64, and in conjunction, the securement member 4 of the optical fiber unit 100 is also moved rearward.

The first optical ferrule 1A can move in the front and back direction in the holding space SP11 of the body 52, and the second ferrule 1B can move in the front and back direction in the holding space SP21 of the body 62. As a result, the mating profile between the first optical ferrule 1A that is assembled into the first optical connector 5 and the second optical ferrule 1B that is assembled into the second optical connector 6 will be at a slant. In other words, the first optical ferrule 1A and the second optical ferrule 1B mutually extend in the vertical direction and begin to mate, but as mating progresses, the securement member 4 on the second optical ferrule 1B side will move rearward, and the optical ferrule unit 100 (fiber ribbon 3) will become a point of support for the securement member 4 and will deform (bend), and thus the first optical ferrule 1A and the second optical ferrule 1B will slant while maintaining the mating profile (first slant). Even if the first optical ferrule 1A and the second optical ferrule 1B are completely mated, the second optical connector 6 will be pressed until the latch 507 of the first optical connector 5 engages with the latch hole 607 of the second optical connector 6, the optical ferrule unit 100 will further deform as a point of support for the securement member 4, and the first optical ferrule 1A and the second optical ferrule 1B will slant further while maintaining the mating profile (second slant).

In this manner, an elastic force (reaction force of deformation) acts in a direction that pushes the first optical ferrule 1A and the second optical ferrule 1B together because the optical ferrule unit 100 is deformed by the first slant and the second slant of the optical ferrules 1A and 1B. Therefore, stable light transmission characteristics can be maintained between the optical ferrules 1A and 1B, even with the effects of vibration and the like. In this case, the optical connectors 5 and 6 are pressed while the optical ferrules 1A and 1B are slanting, so the mating force of the optical connectors 5 and 6 can be reduced. In other words, when the optical connectors 5 and 6 are mated in a condition where the optical ferrules 1A and 1B are not slanted, an extremely large force will act in order to bend the optical ferrule unit 100. In contrast, with the present embodiment, the optical connector is mated while the optical ferrule is slanted, and thus the force that bends the optical ferrule unit 100 can be reduced.

Furthermore, with the present embodiment in the initial condition, the optical ferrules 1A and 1B are mated in the vertical direction, and therefore the mating direction of the optical connectors 5 and 6 and the mating direction of the optical ferrules 1A and 1B are the same, and thus the optical ferrules 1A and 1B can easily be aligned. In contrast, if the optical ferrules 1A and 1B are not slanted from the beginning, the mating direction of the optical ferrules 1A and 1B will not match the mating direction of the optical connectors 5 and 6, and therefore the aligning of the optical ferrules 1A and 1B will be difficult.

With the present embodiment, the center part in the left and right direction of the first case 50 is supported so as to be able to tilt with regards to the first substrate 7 by a pin 743 that extends in the front and back direction, and both end parts in the left and right direction of the first case 50 are elastically supported by the first substrate 7 via a coil spring. In other words, the first case 50 is supported by the first substrate 7 through a floating mechanism. Therefore, positional shifting can be absorbed when mating the optical connectors 5 and 6, and thus the mating operation is easy.

Figure 24:
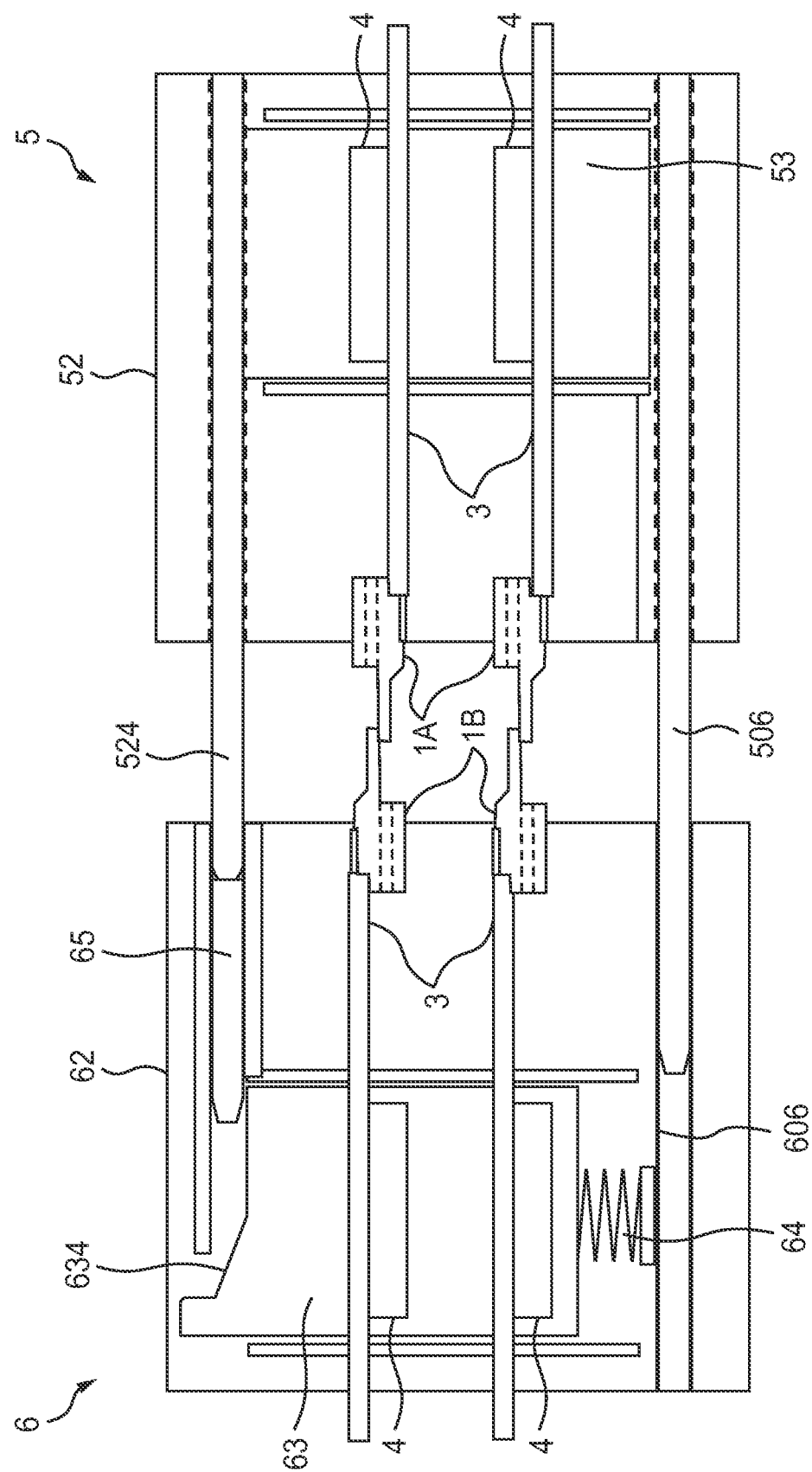
FIG. 24 is a diagram schematically illustrating the function of the connector according to an embodiment of the present invention.
Figure 25:
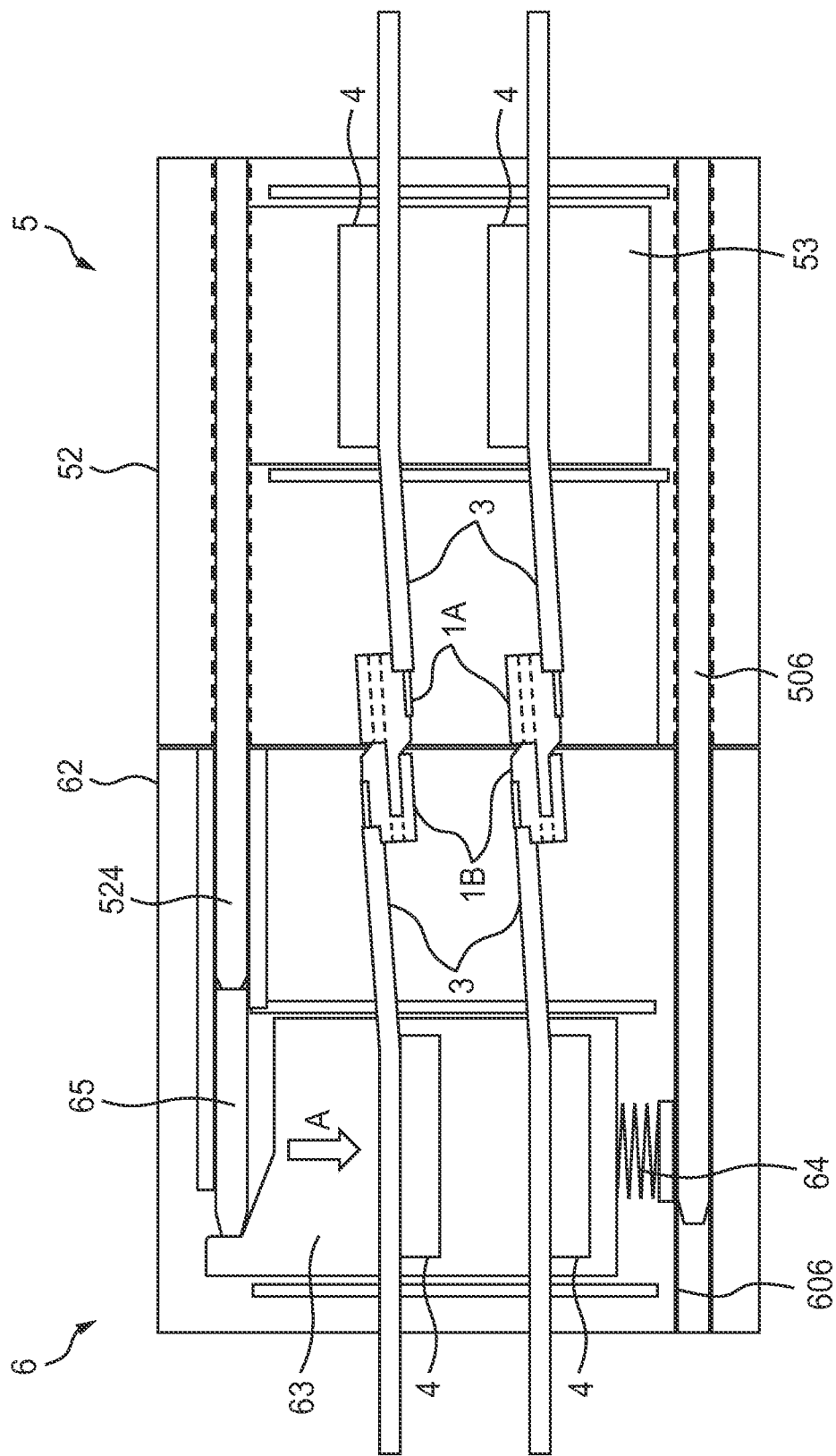
FIG. 25 is a diagram schematically illustrating the function of the connector according to an embodiment of the present invention.

The effect of the aforementioned action of the optical connectors 5 and 6 is described using conceptual diagrams. FIG. 24 and FIG. 25 are diagrams conceptually illustrating an initial mating state and a final mating state of the optical connectors 5 and 6. As illustrated in FIG. 24, in the initial mating state, the mating direction of the first optical connector 5 and the second optical connector 6 matches the mating direction of the first optical ferrule 1A and the second optical ferrule 1B. As illustrated in FIG. 25, in the final mating state, the pressing member 65 is pressed by the protruding part 524 of the body 52, and the securement member 4 moves in the direction of arrow A, or in other words in the perpendicular direction with regards to the mating direction of the optical connectors 5 and 6, together with the plate member 63 against the spring force of the plate spring member 64. Therefore, the optical ferrules 1A and 1B slant relative to the mating direction of the optical connectors 4 and 5, and the fiber ribbon 3, or in other words the optical fiber 2 is deformed (bent), and thus a force that causes mutual contact acts on the contact surfaces of the optical ferrules 1A and 1B.

Figure 26:
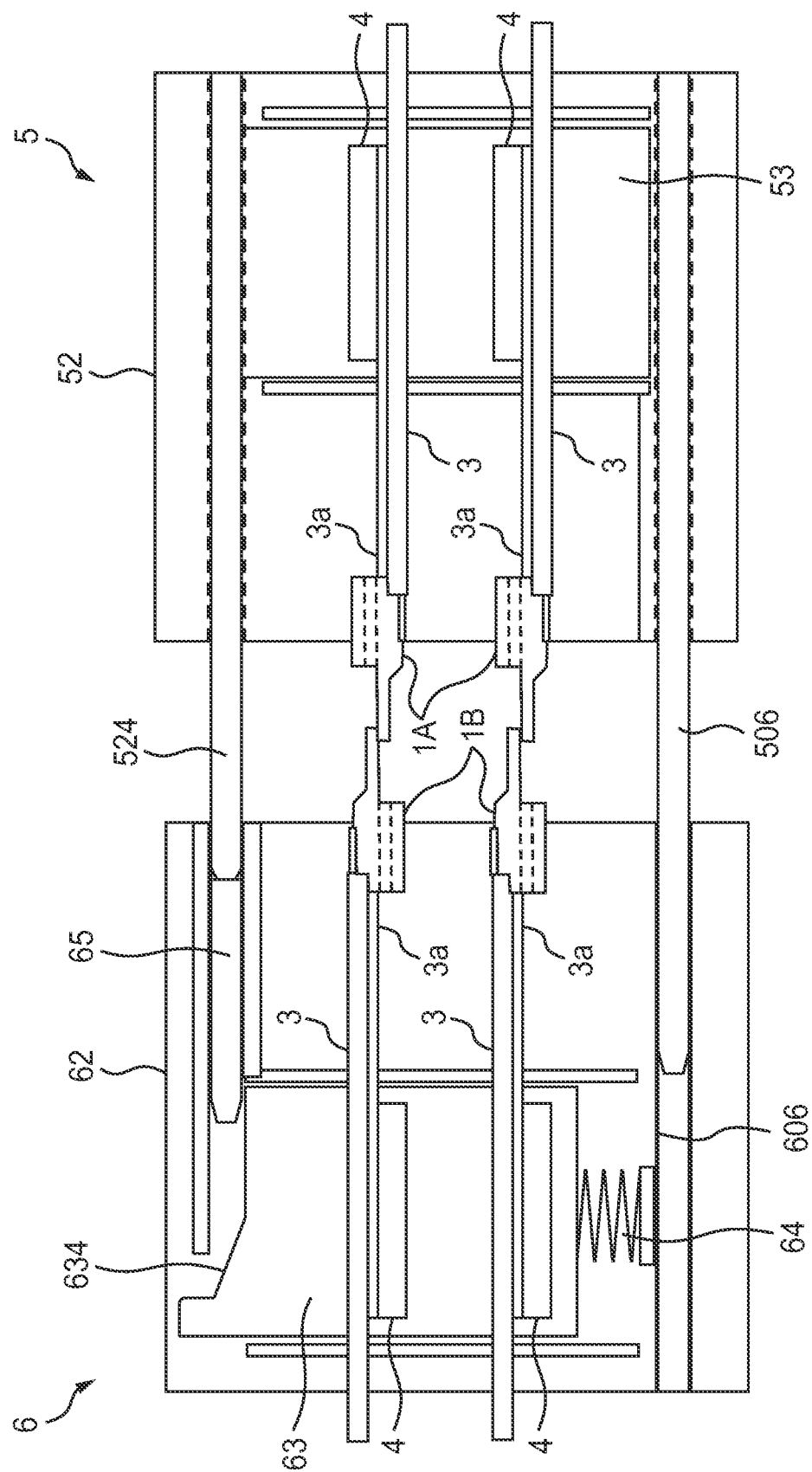
FIG. 26 is a diagram illustrating a modified example of FIG. 24.

FIG. 26 is a diagram illustrating a modified example of FIG. 24. In FIG. 26, an elastic reinforcing member 3*a* is attached to the optical ferrules 1A and 1B and the fiber ribbon 3. Therefore, even if the optical connectors 5 and 6 are used for a long period of time and the elastic force of the fiber ribbon 3 is reduced, a stable contact force can be maintained between the optical ferrules 1A and 1B, and the durability of the optical connectors 5 and 6 can be enhanced. The cross-sectional shape of the elastic reinforcing member 3a in this case can be a variety of shapes. For example, a semicircular curve shape is acceptable. Note that the elastic reinforcing member 3a can be attached to only the optical ferrule 1 or to only the fiber ribbon 3.

Figure 27:
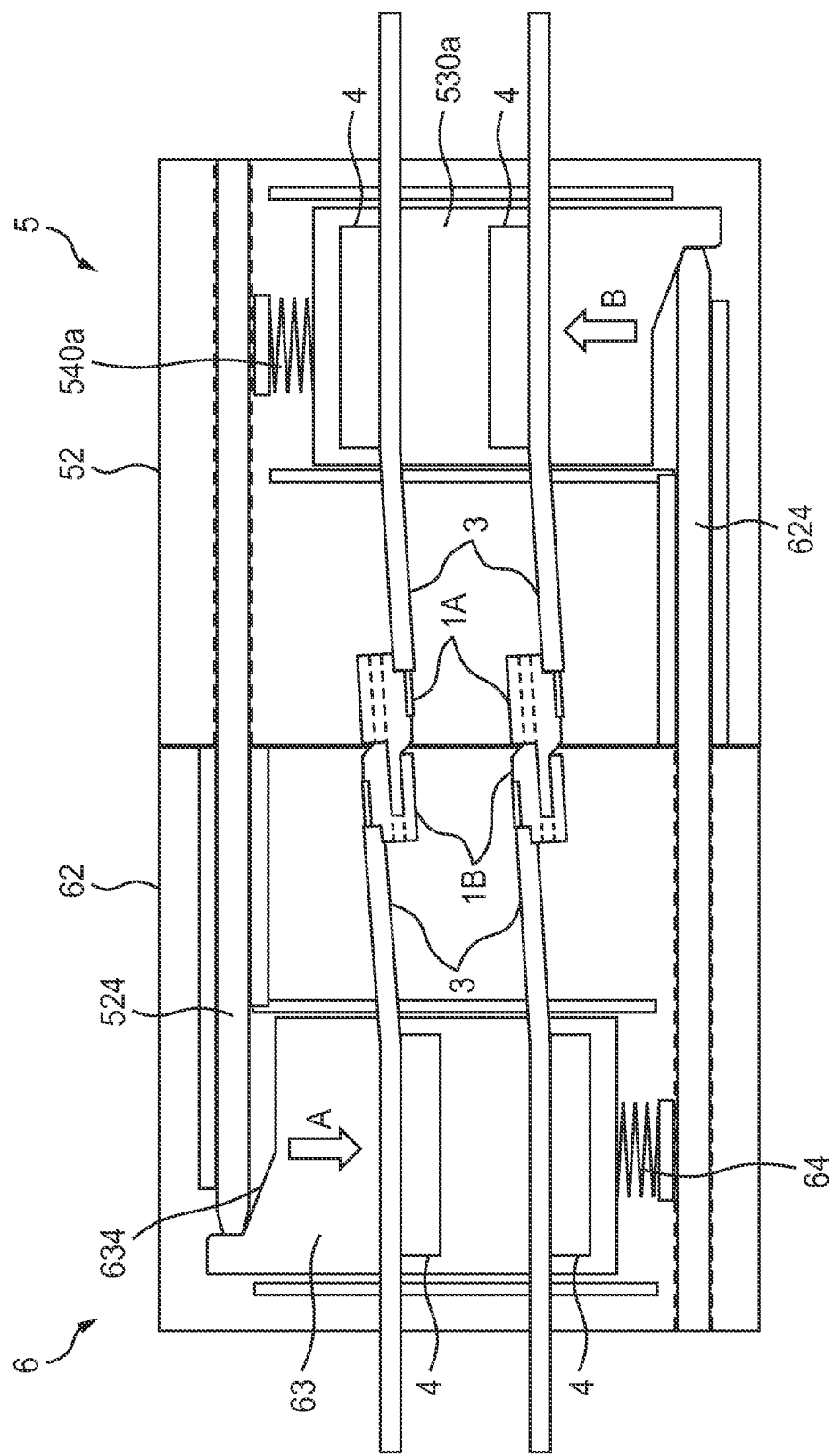
FIG. 27 is a diagram illustrating a modified example of FIG. 25.

FIG. 27 is a diagram illustrating a modified example of FIG. 25. In FIG. 27, the protruding part 524 of the body 52 also acts as a guide pin, and thus the guide pin 506 is omitted. The protruding part 524 abuts the slanted part 624 of the plate member 63, and moves the plate member 63 in the direction of arrow A without using the pressing member 65. Furthermore, in FIG. 27, the plate member 530a of the optical connector 5 is provided so as to be able to slide, similar to optical connector 6, and thus a new plate spring member 540a is provided. Furthermore, a protruding part 624 similar to that of the optical connector 5 is provided on the body 62 of the optical connector 6. Therefore, when the optical connectors 5 and 6 are mated, the plate member 63 moves in the direction of arrow A, and the plate member 530a moves in the direction of arrow B that is opposite the direction of arrow A. In other words, both of the plate members move in opposite directions.

Note that in the example of FIG. 25, similar to FIG. 27, the protruding part 524 extends in the longitudinal direction, and thus the guide pin 506 and the pressing member 65 can be omitted. Furthermore, similar to FIG. 27, a configuration where the plate member 53 can slide is also possible.

Figure 28:
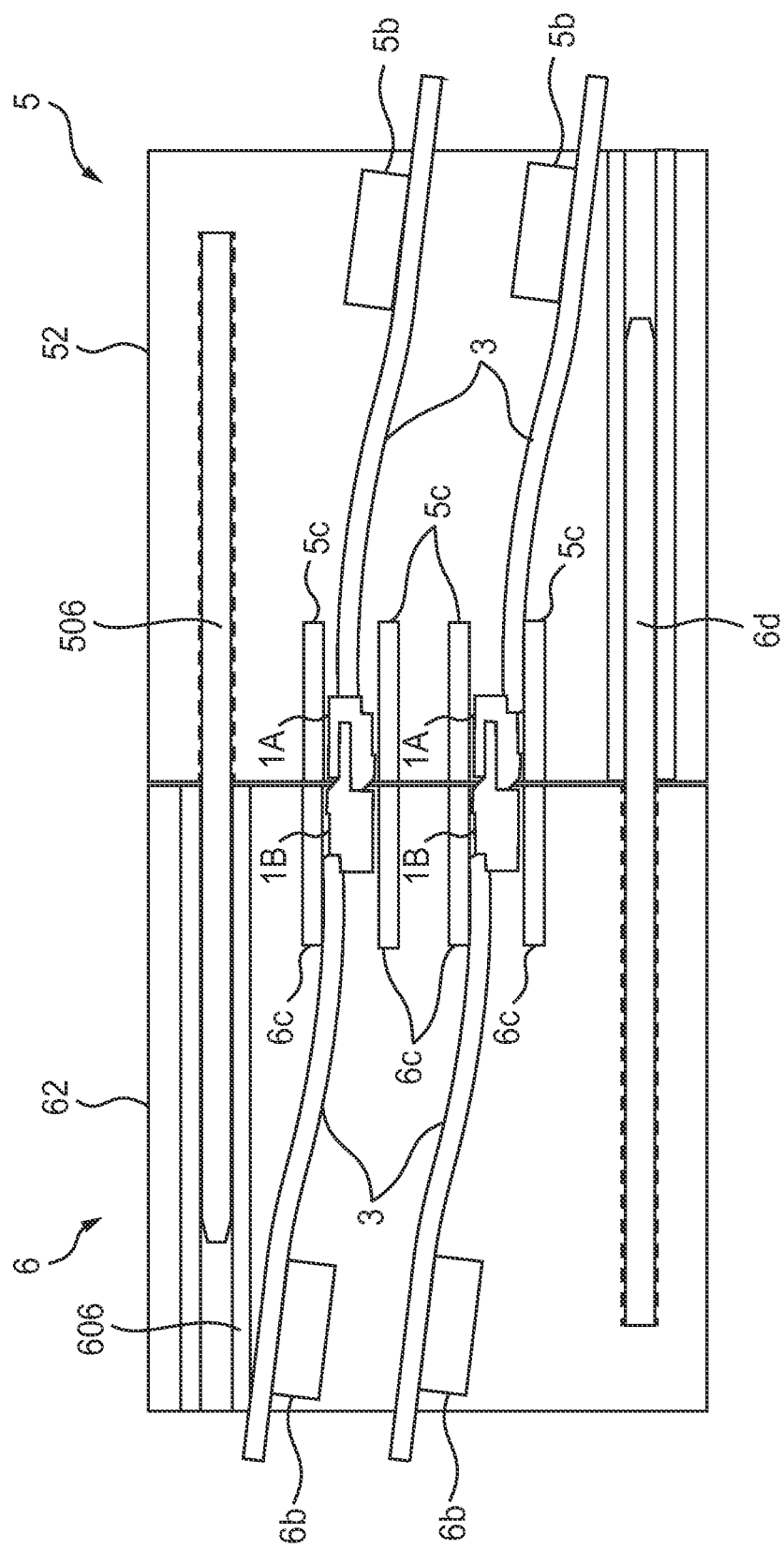
FIG. 28 is a diagram illustrating another modified example of FIG. 25.

FIG. 28 is a diagram illustrating another modified example of FIG. 25. In FIG. 28, angle members 5b and 6b are provided on the bodies 52 and 62 of the optical connectors 5 and 6, and the fiber ribbon 3 extends at a predetermined angle with regards to the mating direction of the optical connectors 5 and 6. Furthermore, guide parts 5C and 6C that prevent tilting of the optical ferrules 1A and 1B are provided in the area of the optical ferrules 1A and 1B. In other words, FIG. 28 illustrates a configuration where a bend occurs in the fiber ribbon 3 prior to mating. Note that in FIG. 28, a guide pin 6d protrudes from the optical connector 6 side, but this can be omitted.

Figure 29:
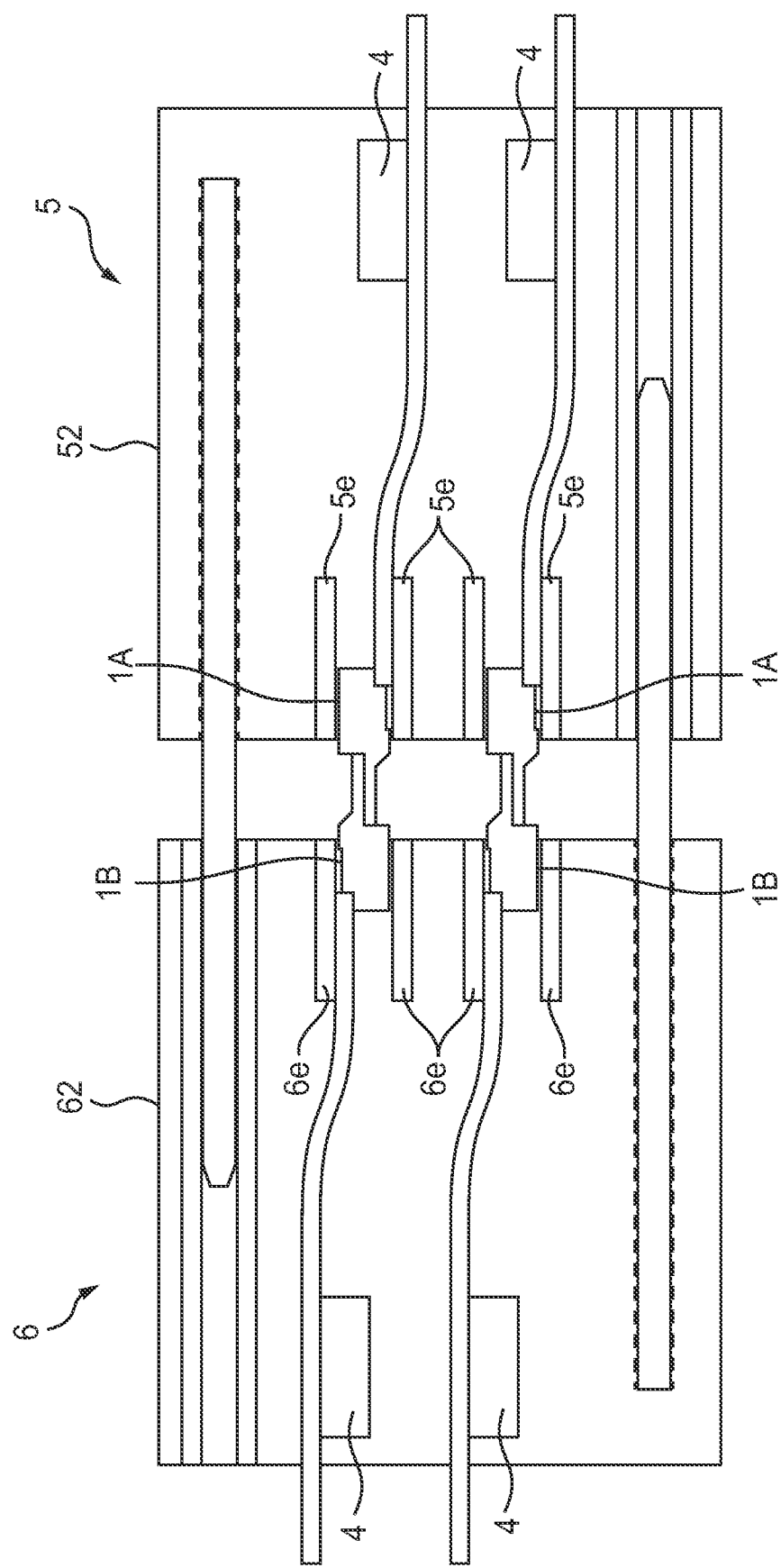
FIG. 29 is a diagram illustrating another modified example of FIG. 24.

FIG. 29 is a diagram illustrating another modified example of FIG. 24. In FIG. 26, the securement member 4 is secured to the inner side of the bodies 52 and 62, and the fiber ribbon 3 extends in the mating direction of the connectors 5 and 6 at the securement part. Guide parts 5e and 6e that movably support the optical ferrules 1A and 1B in the mating direction of the optical connectors 5 and 6 are provided on the bodies 52 and 62. The guide positions of the optical ferrules 1A and 1B are shifted in a direction perpendicular to the mating direction of the connectors 5 and 6 with regards to the securing position of the securement member, and in FIG. 29, the fiber ribbon 3 has a slight S-shaped curve. When the optical connector 6 is mated to the optical connector 5 from this state, the tip part (attaching part to the optical ferrules 1A and 1B) of the optical fiber 2 will move in the bodies 52 and 62 along the mating direction of the connectors 5 and 6. Through this, the bend in the fiber ribbon 3 is increased, and the abutting force of the optical ferrules 1A and 1B is increased. Note that the optical connector 6 can be in an unbent state prior to mating to the optical connector 5. The direction of deformation of the fiber ribbon 3 and the optical fiber 2 in FIGS. 25, 27, 28, and 29 is one example, but it is also possible for the bend to be in the opposite direction from that illustrated.

Note that in the above-described embodiment (FIG. 24), the optical connector 6 is provided with a securement member 4, or in other words a first attaching region, that holds and retains the fiber ribbon 3 as the optical waveguide, and moves in the housing of the body 62 or the like, and with an optical coupler part provided in the housing, and that moves in the housing. In other words, the optical coupler part has a second attaching region, or in other words a V groove 105, that holds and retains the optical waveguide that is held and retained in the first attaching region, and a light direction converting surface 222 that changes the direction of the light received from the optical waveguide when the optical waveguide is held and retained in the first attaching region and the second attaching region, and therefore when the connector 6 mates with the opposing connector 5, the first attaching region will move, causing the optical coupler part to move. In the above-described embodiment, the second attaching region was described as the optical ferrule 1, but in a more precise sense, it is the region where the optical fiber 2 is attached to the optical ferrule 1.

The housing can have any configuration so long as when the optical wave guide is held and retained by the first attaching region and the second attaching region, and the connector is mated to the opposing connector, the first attaching region moves causing the optical waveguide to move while the optical coupler part is also caused to move. The configuration of the first attaching region and the second attaching region is not restricted to the aforementioned configuration. In the above-described embodiment, the first attaching region is primarily moved laterally and the optical coupler part is primarily moved rotationally (tilted) when the optical waveguide is held and retained in the first attaching region and the second attaching region and the connector is mated to the opposite connector, but the movement of the first attaching region and the second attaching region is not restricted thereto.

In the embodiment, when the optical waveguide was held and retained by the first attaching region and the second attaching region, and the connector was mated to the opposite connector, the first attaching region moved along the direction orthogonal to the mating direction of the connector, but a portion of the first attaching region may also move. The optical coupler part of the above-described embodiment was stably supported in the housing by the optical waveguide being held and retained by the first attaching region and the second attaching region, however, the optical coupler part may be stably supported in the housing due at least to the optical waveguide being held and retained by the first attaching region and the second attaching region, or due only to the optical waveguide being held and retained by the first attaching region and the second attaching region.

The embodiments can be described from various perspectives. For example, in the example of FIG. 24, when the connector 6 is mated to the opposing connector 5, the first attaching region (securement member 4) and the second attaching region (optical ferrule 1) will move and cause the bend of the optical waveguide (fiber ribbon 3) to increase. In this case, the optical waveguide is not bent before the connector 6 is mated to the opposing connector 5. When the connector 6 is mated to the opposing connector 5, the first attaching region moves in a direction essentially perpendicular to the mating direction of the connector 6, and the second attaching region moves in a direction that is essentially parallel to the mating direction of the connector 6.

The description given above is and will always be only one example, and the present invention is not limited by the embodiments and modified examples described above so long as the characteristics of the present invention are not violated. Obvious substitutions and replacements that maintain the identity of the invention are included in the compositional elements of the embodiments and modified examples described above. In other words, other configurations considered to be within the scope of the technical concept of the present invention are included in the scope of the present invention. In addition, any combination of one or more of the embodiments and modified examples described above are possible.

REFERENCE NUMERALS

1: optical ferrule
2: optical fiber
4: securement member
10: upper wall
11: bottom wall
12 and 13: side walls
14: guide opening
15: guide part
20: optical coupler part
21: alignment part
22: light direction converter
221 (223): entrance surface
222: light direction converting surface
223 (221): exiting surface

The invention claimed is:
1. An optical ferrule, comprising:
an upper wall;
a bottom wall on the opposite side of the upper wall;
a pair of side walls that face each other and connect the upper wall and the bottom wall, such that a guide opening is formed on an inside thereof together with the upper wall and the bottom wall;
a guide part that extends forward from the upper wall and the guide opening; and
an optical coupler provided on an upper surface of the upper wall so that the upper wall is disposed between the optical coupler and the guide opening;
the optical coupler having a waveguide aligning part and a light direction converter, the waveguide aligning part aligns and holds an optical waveguide, and the light direction converter comprising:
an entrance surface that receives incoming light from the optical waveguide that is aligned and arranged by the waveguide aligning part;
a light direction converting surface that receives light from the entrance surface propagated along an incoming axis, and reflects the received light, wherein the reflected light is propagated by the light direction converting surface along a direction converted axis that is different from the incoming axis; and
an exit surface that receives light from the light direction converting surface and propagates the received light along an outgoing axis, and transmits the light as outgoing light emitted from the optical ferrule;
the optical ferrule having an integrated structure.
2. A first optical ferrule and a second optical ferrule according to claim 1 that are mated together,
wherein the respective guide parts of the first optical ferrule and the second optical ferrule are inserted inside of the guide openings of the first optical ferrule and the second optical ferrule on the opposing side.
3. The optical ferrule according to claim 1, wherein the ferrule is a male-female unit.

4. The optical ferrule according to claim 1, wherein:
a first protruding part that protrudes from an upper surface and a bottom surface of the guide part and extends along a length direction of the optical ferrule; and
a second protruding part that protrudes from a bottom surface of the upper wall and an upper surface of the bottom wall, and extends along the length direction of the ferrule toward the guide opening.
5. A first optical ferrule and a second optical ferrule according to claim 4,
wherein when the first optical ferrule and the second optical ferrule are mated together, the respective first protruding parts of the first optical ferrule and the second optical ferrule slide and contact the second protruding parts of the opposing first optical ferrule and the second optical ferrule.
6. The optical ferrule according to claim 1, which is configured so as to mate with another optical ferrule according to claim 1 along a mating direction that is essentially parallel to the length direction of the optical ferrule.
7. A connector with a housing,
the housing comprising:
a first attaching region that holds and retains an optical waveguide; and
an optical coupler disposed inside the housing;
the optical coupler comprising:
a second attaching region that holds and retains the optical waveguide that is held and retained in the first attaching region; and
a light direction converting surface that receives light from the optical waveguide and converts the direction, when the optical waveguide is held and retained in the first attaching region and the second attaching region;
wherein when the connector is mated to an opposing connector, the first attaching region moves within the housing and causes the optical coupler to move within the housing.
8. The connector according to claim 7,
wherein the optical waveguide is held and retained in the first attaching region and the second attaching region, and during mating of the connector to the opposing connector, the first attaching region moves and causes the optical coupler to move while causing the optical waveguide to move.
9. The connector according to claim 7,
wherein the optical waveguide is held and retained in the first attaching region and the second attaching region, and during mating of the connector to the opposing connector, the first attaching region at least partially moves along a direction that orthogonal to a mating direction of the connector.
10. The connector according to claim 7,
wherein the optical coupler is stably supported inside the housing, due at least to the optical waveguide being held and retained in the first attaching region and the second attaching region, or due only to the optical waveguide being held and retained in the first attaching region and the second attaching region.
11. The connector according to claim 7,
wherein during mating of the connector to the opposing connector, the first attaching region moves in a direction essentially perpendicular to a mating direction of the connector, and the second attaching region moves in a direction essentially parallel to the mating direction of the connector.

12. The connector according to claim 7,
wherein the optical waveguide is held and retained in the first attaching region and the second attaching region, and during mating of the connector to the opposing connector, the first attaching region primarily moves laterally and causes the optical coupler to primarily move rotationally.

13. A connector with a housing,
the housing comprising:
a first attaching region that holds and retains an optical waveguide, and is retained inside the housing;
an optical coupler disposed inside the housing and that moves inside the housing during mating of the connector to an opposing connector;
the optical coupler comprising:
a second attaching region that holds and retains the optical waveguide that is held and retained in the first attaching region; and
a light direction converting surface that receives light from the optical waveguide and converts the direction into another direction different than a mating direction of the connector, when the optical waveguide is held and retained in the first attaching region and the second attaching region;
wherein when the connector is mated to the opposing connector, the second attaching region moves inside the housing along the mating direction of the connector, and increases a bend of the optical waveguide.

14. The connector according to claim 13,
wherein the optical waveguide is not bent before the connector is mated to the opposing connector.

15. A connector with a housing,
the housing comprising:
a first attaching region that holds and retains an optical waveguide; and
an optical coupler disposed inside the housing and that moves inside the housing during mating of the connector to an opposing connector;
the optical coupler comprising:
a second attaching region that holds and retains the optical waveguide that is held and retained in the first attaching region; and
a light direction converting surface that receives light from the optical waveguide and converts the direction into another direction different than a mating direction of the connector, when an optical waveguide is held and retained in the first attaching region and the second attaching region;
wherein when the connector is mated to the opposing connector, the first attaching region and the second attaching region move within the housing, and cause an increase in a bend of the optical waveguide.

16. The connector according to claim 15,
wherein the optical waveguide is not bent before the connector is mated to the opposing connector.

* * * * *